US006470026B1

(12) United States Patent
Pearson et al.

(10) Patent No.: US 6,470,026 B1
(45) Date of Patent: Oct. 22, 2002

(54) FIBRE CHANNEL LOOP MAP INITIALIZATION PROTOCOL IMPLEMENTED IN HARDWARE

(75) Inventors: Pery Andrew Pearson, El Dorado Hills, CA (US); George Taylor McDavid, Orangevale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,580

(22) Filed: Oct. 30, 1998

(51) Int. Cl.[7] .............................................. H04J 15/00
(52) U.S. Cl. ..................... 370/463; 370/503; 709/222
(58) Field of Search ............................. 709/222, 236, 709/250; 370/282, 463, 276, 503

(56) References Cited

U.S. PATENT DOCUMENTS 6,081,847 A * 6/2000 Lin ............................ 370/282
6,148,004 A * 11/2000 Nelson et al. .............. 370/463
6,278,718 B1 * 8/2001 Eschholz .................... 370/503
6,304,910 B1 * 10/2001 Roach et al. ............... 370/276

* cited by examiner

Primary Examiner—Salvatore Cangialosi

(57) ABSTRACT

A fiber channel interface controller incorporating a cost-efficient hardware implementation of the fiber channel arbitrated loop initialization protocol. Cost efficiency is achieved by determining the minimal buffer size required for storing information extracted from fiber channel arbitrated loop initialization frames and including in the fiber channel interface controller a memory buffer having this calculated minimum size. The inherent buffering capacity within all FC ports of the arbitrated loop and the ability to generate, on the fly, large portions of fiber channel arbitrated loop initialization frames, rather than storing and forwarding entire fiber channel arbitrated loop initialization frames, both combine to decrease the memory buffer size requirements for the fiber channel interface controller and to decrease the time required to carry out fiber channel arbitrated loop initialization. The decreased time required to carry out fiber channel arbitrated loop initialization results in less down time and increased availability of the fiber channel that are import.

15 Claims, 27 Drawing Sheets

| INITIATOR | | TARGET | |
|---|---|---|---|
| STATE | EVENTS | EVENTS | STATE |
| BUS FREE 614 | | | BUS FREE |
| ARBITRATION 616 | ASSERT BSY AND D7 ASSERT SEL | | ARBITRATION |
| SELECTION 618 | ASSERT DX AND ATN | | SELECTION |
| SELECTION 620 | DROP BSY DROP SEL | ASSERT BSY | SELECTION |
| MESSAGE OUT 622 | IDENTIFY 625 — DISCONNECT PRIVILEDGE / LUN 623 / 624 | | MESSAGE OUT |
| MESSAGE OUT | QUEUE TAG MESSAGE SIMPLE QUEUE TAG / QUEUE TAG 626 / 627 | | MESSAGE OUT |
| COMMAND 628 | READ OR WRITE 630 — OPCODE (READ OR WRITE) 632 / FLAGS / LOGICAL BLOCK NO. 636 / DATA LENGTH 638 | | COMMAND |
| MESSAGE IN 640 | | DISCONNECT 642 | MESSAGE IN |
| BUS FREE 644 | | DROP BSY | BUS FREE |

FIG.6A

| INITIATOR | | | TARGET |
|---|---|---|---|
| STATE | | | STATE |
| BUS FREE 646 | | | BUS FREE |
| ARBITRATION 648 | | ASSERT BSY AND DX ASSERT SEL AND I/O | ARBITRATION |
| RESELECTION 650 | | ASSERT DX AND ATN DROP SEL | RESELECTION |
| MESSAGE IN 652 | IDENTIFY<br>LUN — 654 | | MESSAGE IN |
| MESSAGE IN | QUEUE TAG MESSAGE<br>SIMPLE QUEUE TAG / QUEUE TAG — 656 | | MESSAGE IN |
| DATA IN (READ) OUT (WRITE) 658 | ACK   DATA   REQ<br>READ → WRITE | | DATA IN (READ) OUT (WRITE) |
| OPTIONAL DISCONNECT/ RECONNECT 660 | MESSAGE IN | SAVE POINTERS | MESSAGE IN |
| | MESSAGE IN | DISCONNECT | MESSAGE IN |
| | BUS FREE | | BUS FREE |
| | ARBITRATION | | ARBITRATION |
| | RESELECTION | | RESELECTION |
| | MESSAGE IN | IDENTIFY | MESSAGE IN |
| | MESSAGE IN | QUEUE TAG MESSAGE | MESSAGE IN |
| DATA | ACK   DATA   REQ<br>READ → WRITE | | DATA |
| MESSAGE IN 662 | | DISCONNECT | MESSAGE IN |
| BUS FREE 664 | | DROP BSY | BUS FREE |

FIG.6B

| INITIATOR | | TARGET | |
|---|---|---|---|
| STATE | | | STATE |
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | | IDENTIFY <br> \| LUN \| — 674 | MESSAGE IN |
| MESSAGE IN | | QUEUE TAG MESSAGE <br> \| SIMPLE QUEUE TAG \| QUEUE TAG \| — 676 | MESSAGE IN |
| STATUS 678 | | \| 00h \| — 680 | STATUS |
| MESSAGE IN 682 | | COMMAND COMPLETE <br> \| 00h \| — 684 | MESSAGE IN |
| BUS FREE 686 | | DROP BSY | BUS FREE |

FIG.6C

| LI_ID | _FL | DATA |
|---|---|---|
| LISM | | 8-BYTE PORT NAME ~2006 |
| LIFA | | 16-BYTE AL_PA BIT MAP ~2008 |
| LIPA | | 16-BYTE AL_PA BIT MAP ~2010 |
| LIHA | | 16-BYTE AL_PA BIT MAP ~2012 |
| LISA | | 16-BYTE AL_PA BIT MAP ~2014 |
| LIRP | | 128-BYTE AL_PA POSITION MAP ~2017 |
| LILP | | 128-BYTE AL_PA POSITION MAP ~2018 |

FIBRE CHANNEL LOOP MAP INITIALIZATION PROTOCOL IMPLEMENTED IN HARDWARE

TECHNICAL FIELD

The present invention relates to fibre channel interface controllers used to implement fibre channel ports and, in particular, to a method and system for implementing, in hardware, the final two phases of fibre channel arbitrated loop initialization protocol that concern the construction and the distribution of an arbitrated loop physical address position map.

BACKGROUND OF THE INVENTION

The fibre channel ("FC") is an architecture and protocol for a data communication network for interconnecting a number of different combinations of computers and peripheral devices. The FC supports a variety of upper-level protocols, including the small computer systems interface ("SCSI") protocol. A computer or peripheral device is linked to the network through an FC port and copper wires or optical fibres. An FC port includes a transceiver and an interface controller, and the computer peripheral device in which the FC port is contained is called a "host." The FC port exchanges data with the host via a local data bus, such as a peripheral computer interface ("PCI") bus. The interface controller conducts lower-level protocol exchanges between the fibre channel and the computer or peripheral device in which the FC port resides.

In one type of FC topology, called the "fibre channel arbitrated loop", the various interconnected FC ports carry out an arbitrated loop initialization protocol in order to initialize data communications traffic between the FC ports of the arbitrated loop. The arbitrated loop initialization protocol involves a number of different phases. In the first of two final phases of arbitrated loop initialization, the FC ports construct, one-by-one, a position map that represents their relative positions within the arbitrated loop, and, then, in the second of the final two phases, distribute the completed position map amongst themselves. In previous and current implementations of FC interface controllers, these final two phases of the arbitrated loop initialization protocol were either not implemented or were implemented in firmware, so that these final two phases of the arbitrated loop initialization protocol were either not available or were carried out at relatively slow speed. For many reasons, including the necessity for high-availability systems to quickly reinitialize arbitrated loops following a reset of any FC port within the arbitrated loop, it is desirable for the arbitrated loop initialization protocol to operate far more quickly than previous and current implementations allow. A need has therefore been recognized by developers and users of fibre channel interface controllers for an interface controller that implements, in hardware, the arbitrated loop initialization protocol.

SUMMARY OF THE INVENTION

The present invention provides a fibre channel ("FC") interface controller that implements, in hardware, all phases of the FC arbitrated loop initialization protocol. In particular, the final two phases of the arbitrated loop initialization protocol that involve the construction and distribution of a somewhat lengthy position map are implemented to execute within the FC interface controller, without host computer or host peripheral device intervention. The efficient and economical implementation of the present invention takes advantage of the inherent dynamic buffering capacity of the FC ports interconnected by an FC arbitrated loop and of the fact that relatively large portions of the data exchanged between FC ports of the FC arbitrated loop during arbitrated loop initialization need not be buffered for forwarding, but can instead be generated on the fly during transmission of the data. The minimization of the amount of memory buffer requirements within the interface controller contributes significant cost advantages in the design and production of the interface controller, and simplifies the algorithms and circuitry that implement the FC arbitrated loop protocol. Because the final two phases of the arbitrated loop initialization protocol are implemented to execute within the FC interface controller, without host computer or host peripheral device intervention, the FC arbitrated loop initialization can proceed much faster, decreasing the time that the FC is unavailable for data communications. This is, in turn, important in high-availability systems, where continuous data communications are desirable.

BRIEF DESCRIPTION OF THE DRAWINGS

FIGS. 6A–6C illustrate the SCSI protocol involved in the initiation and implementation of read and write I/O operations.

FIG. 20 shows the data payload of FC frames transmitted by FC nodes in an arbitrated loop topology during each of the seven phases of loop initialization shown in FIG. 19.

DETAILED DESCRIPTION OF THE INVENTION

Figure 1A:
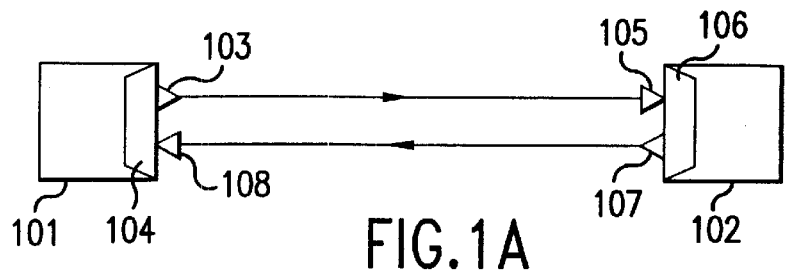
FIGS. 1A–1C shows the three different types of FC interconnection topologies.

The present invention will be described below in six subsections. The first three subsections provide greater detail about the fibre channel architecture and protocol, the SCSI architecture and protocol, and implementation of the SCSI protocol on top of the fibre channel protocol. The fourth subsection discusses the fibre channel arbitrated loop intialization process. The fifth subsection provides a general description of the present invention, and the sixth subsection provides a detailed pseudo-code implementation of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2"), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, 101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node, and that implements, in hardware and firmware, the lower levels of the FC protocol. The FC node generally exchanges data and control information with the FC port using shared data structures in shared memory and using control registers in the FC port. The FC port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
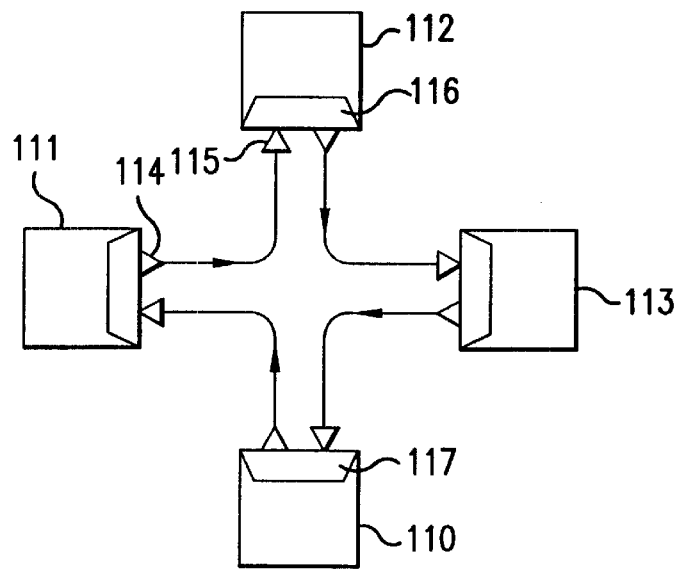
Figure 1C:
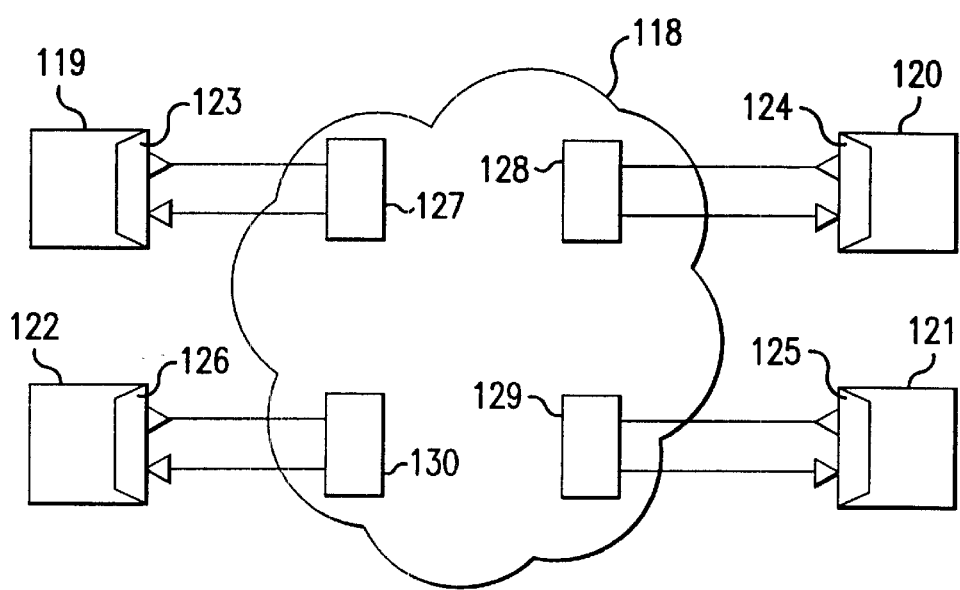

The FC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the FC port 104 of the first node 101 to the receiver 105 of the FC port 106 of the second node 102, and by directly connecting the transmitter 107 of the FC port 106 of the second node 102 to the receiver 108 of the FC port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active PC ports, and may include additional non-participation FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119–122 are connected. The N_Ports 123–126 within the FC nodes 119–122 are connected to F_Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports.

When optical fibers are employed, a single FC fabric can extend for ten kilometers. The FC can support interconnection of more than 16,000,000 FC nodes. A single FC host adapter can transmit and receive data at rates of up to 200 Mbytes per second. Much higher data exchange rates are planned for FC components in the near future.

Figure 2:
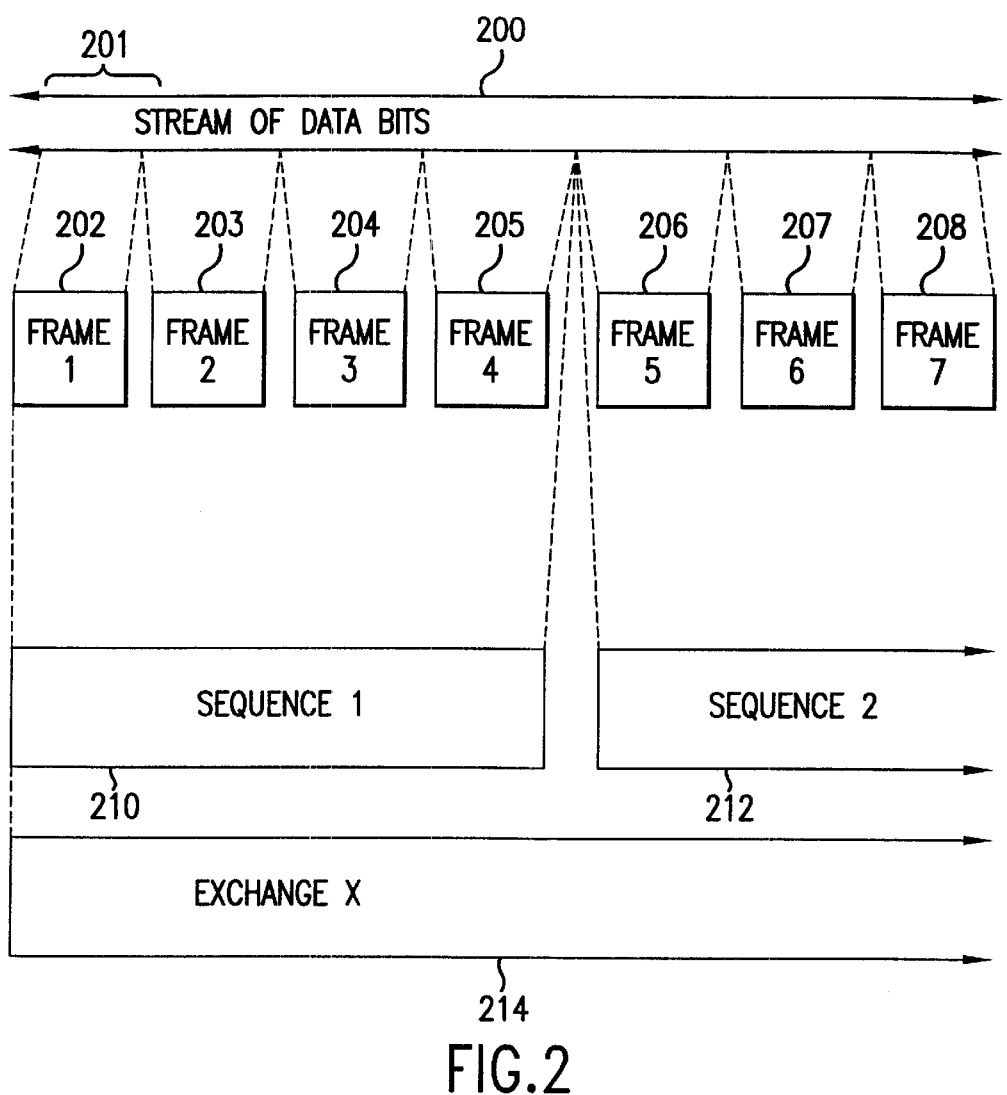
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 4 10-bit characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

Figure 3:
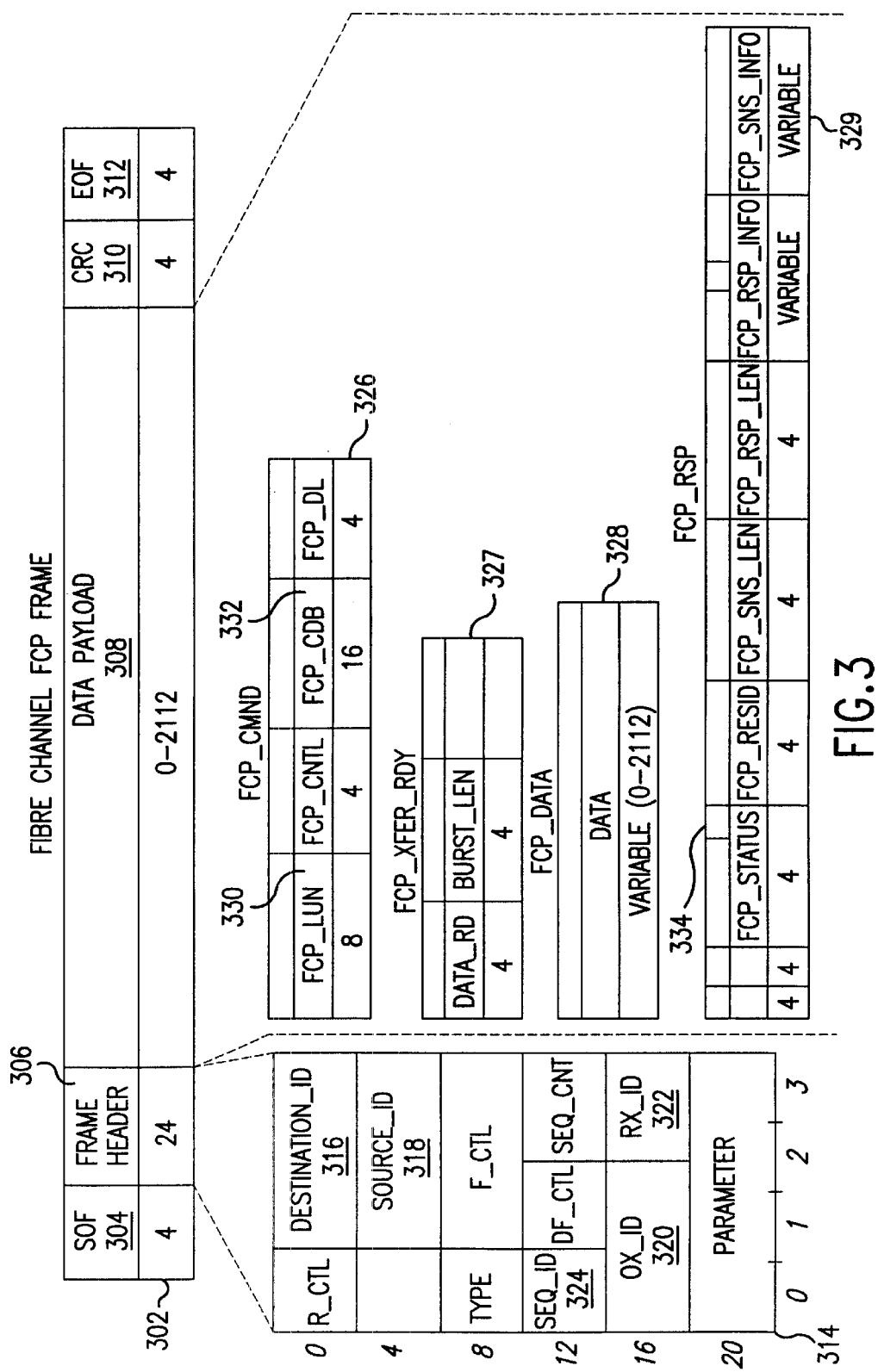
FIG. 3 shows the contents of a standard FC frame.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC port for the frame. The source identifier ("S_ID"), or SOURCE_ID 318, is a 24-bit address that indicates the FC port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer comunands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
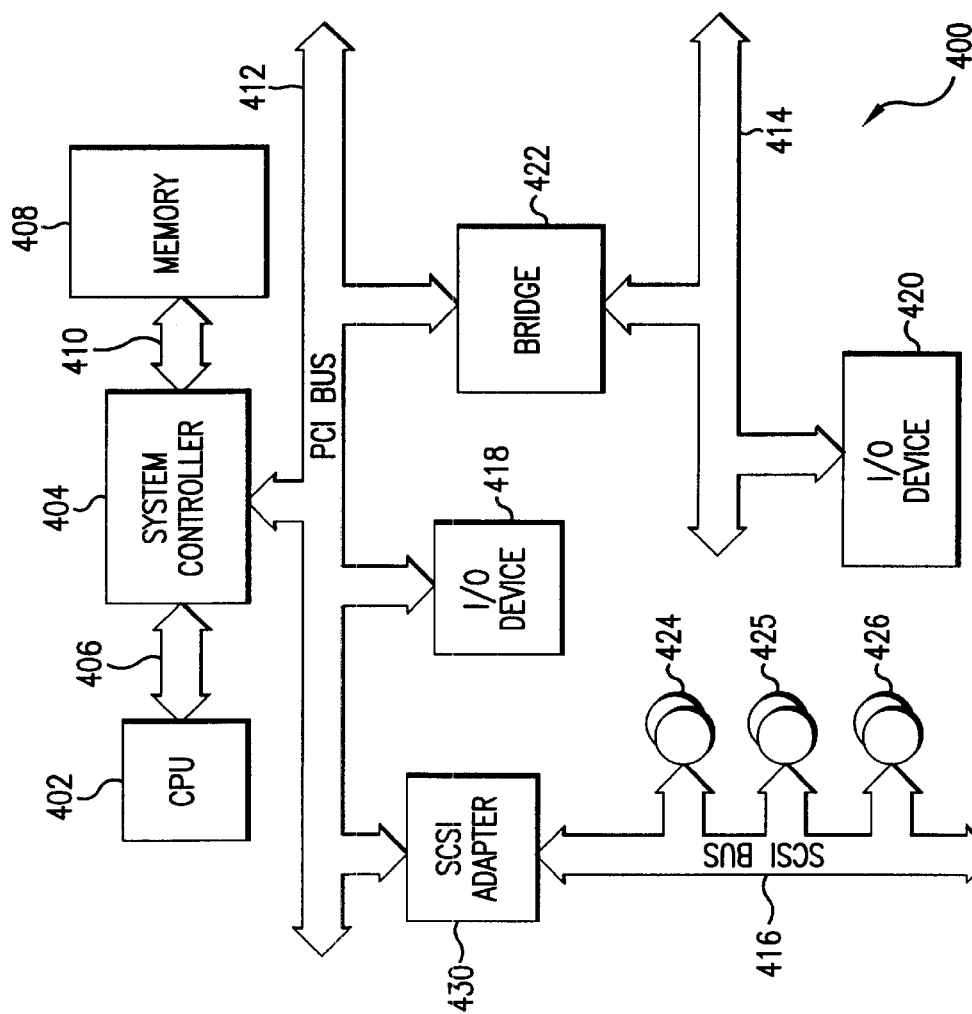
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
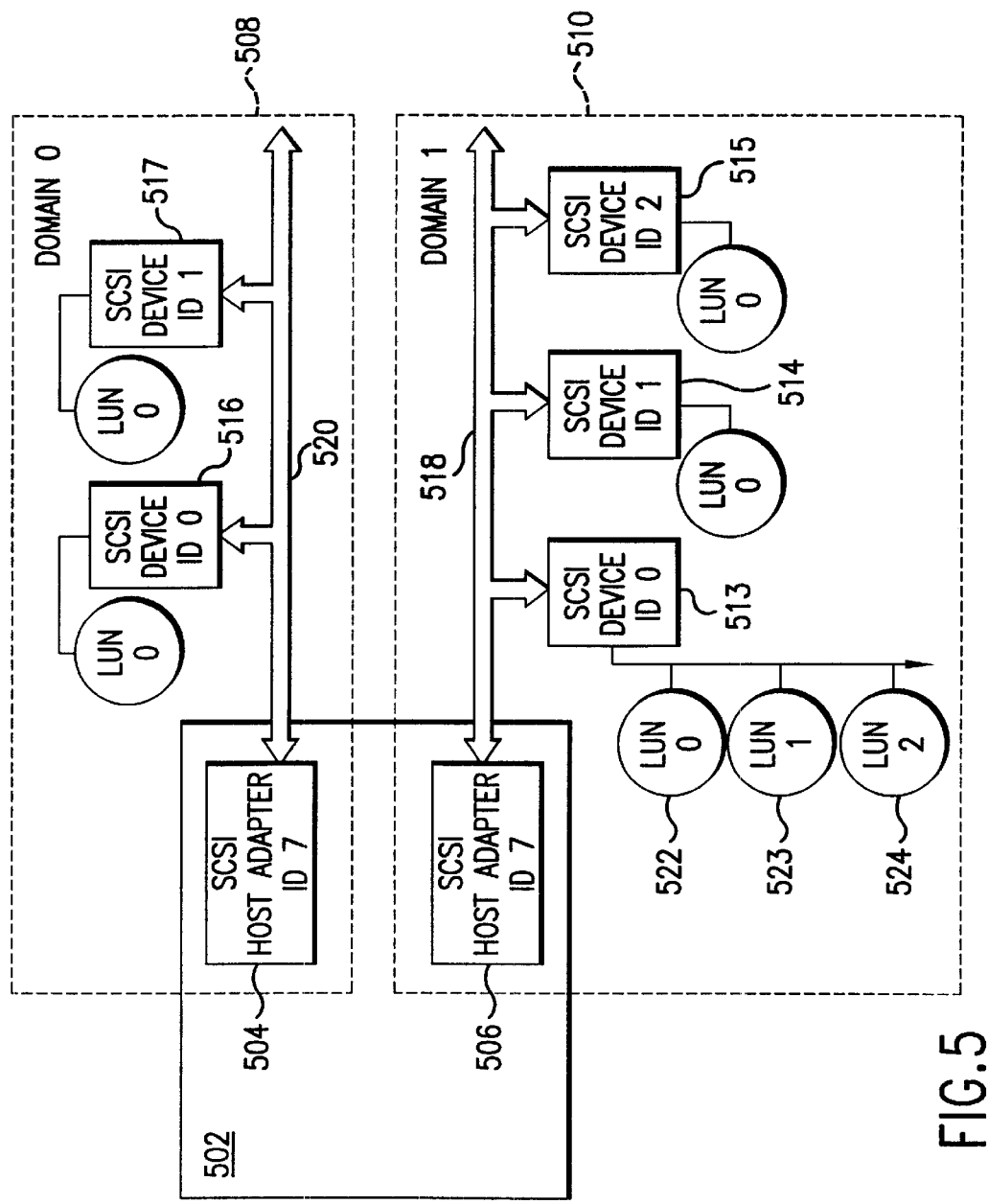
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/O commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424–426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore concurrently manage 656 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

Figure 7A:
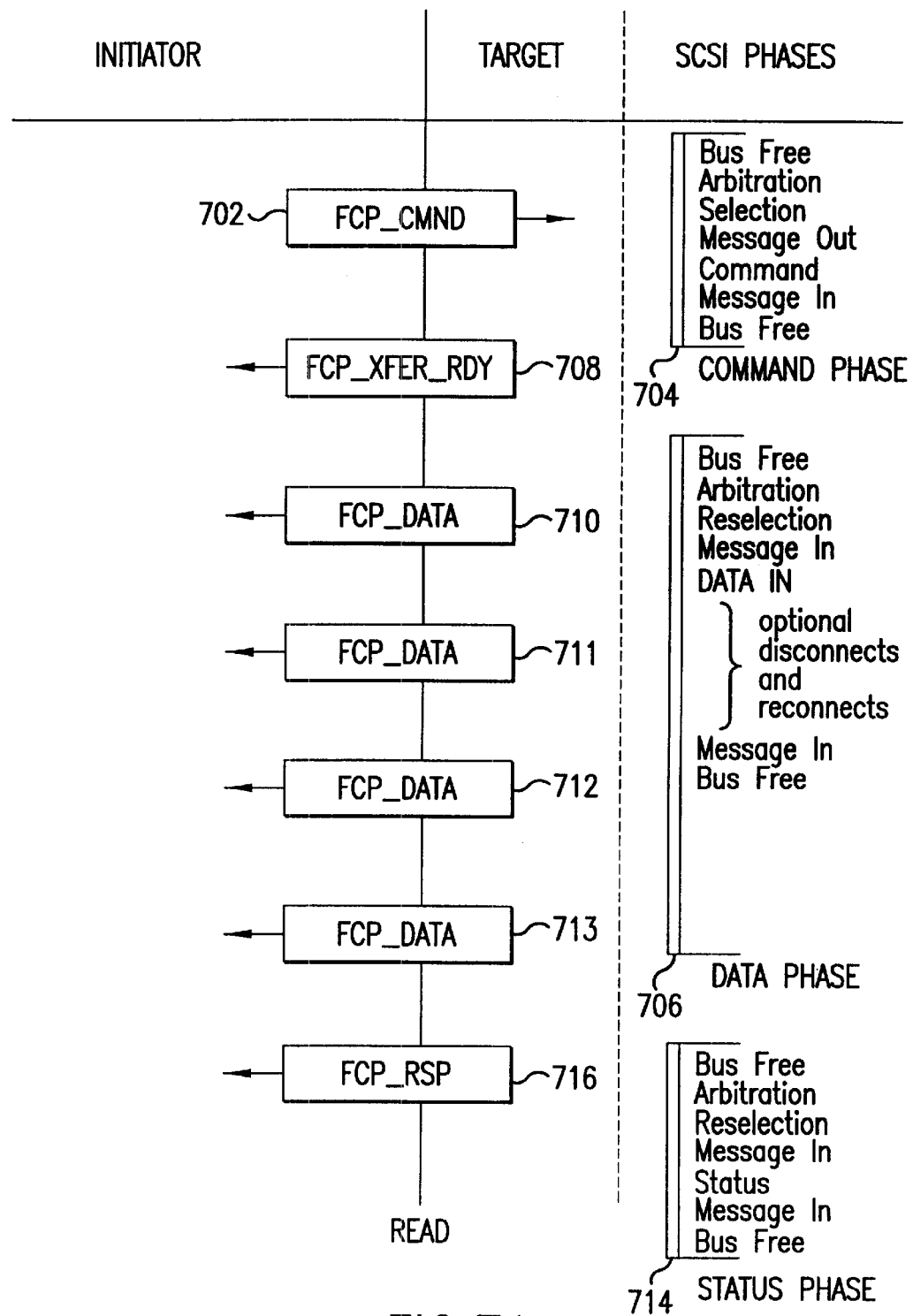
FIGS. 7A–7B illustrate a mapping of the FC Protocol to SCSI sequences exchanged between an initiator and target and the SCSI bus phases and states described in FIGS. 6A–6C.
Figure 7B:
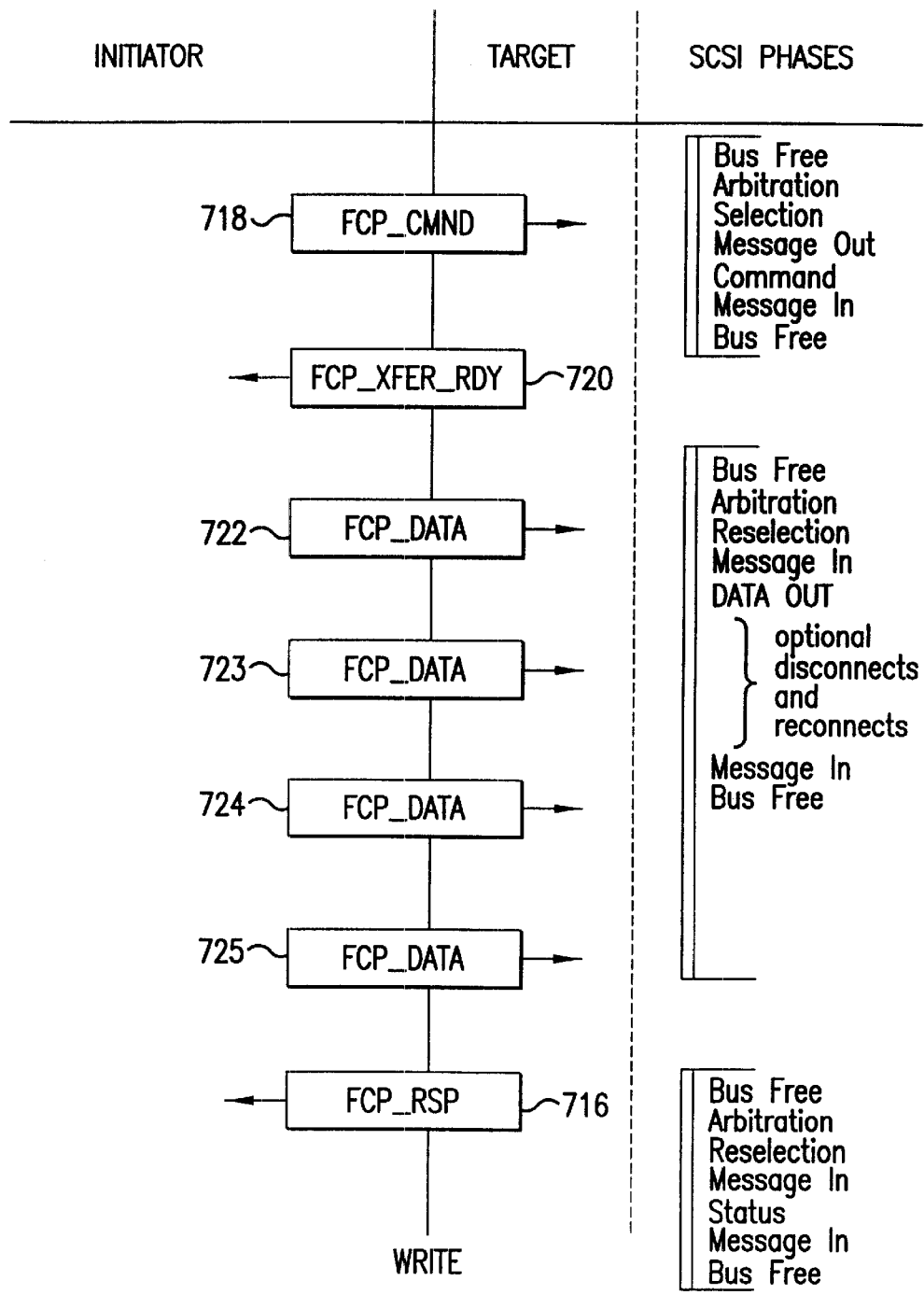

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722–725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

The Tachyon TL Mass Storage Interface Controller and Tachyon TL Interface

The Tachyon TL Mass Storage Interface Controller ("TL") is a high-performance, low-cost, loop-based interface controller for use in the FC ports that interconnect peripheral devices and computers to an FC arbitrated loop. In this subsection, an overview of the functionality of, and interface to, the TL will be presented. A more detailed description of the TL is included in U.S. Pat. application Ser. No. 68/582,001, entitled "Fibre Channel Controller," assigned to the Hewlett Packard Company, and filed on Oct. 30, 1998 that is hereby incorporated by reference in its entirety.

Figure 8:
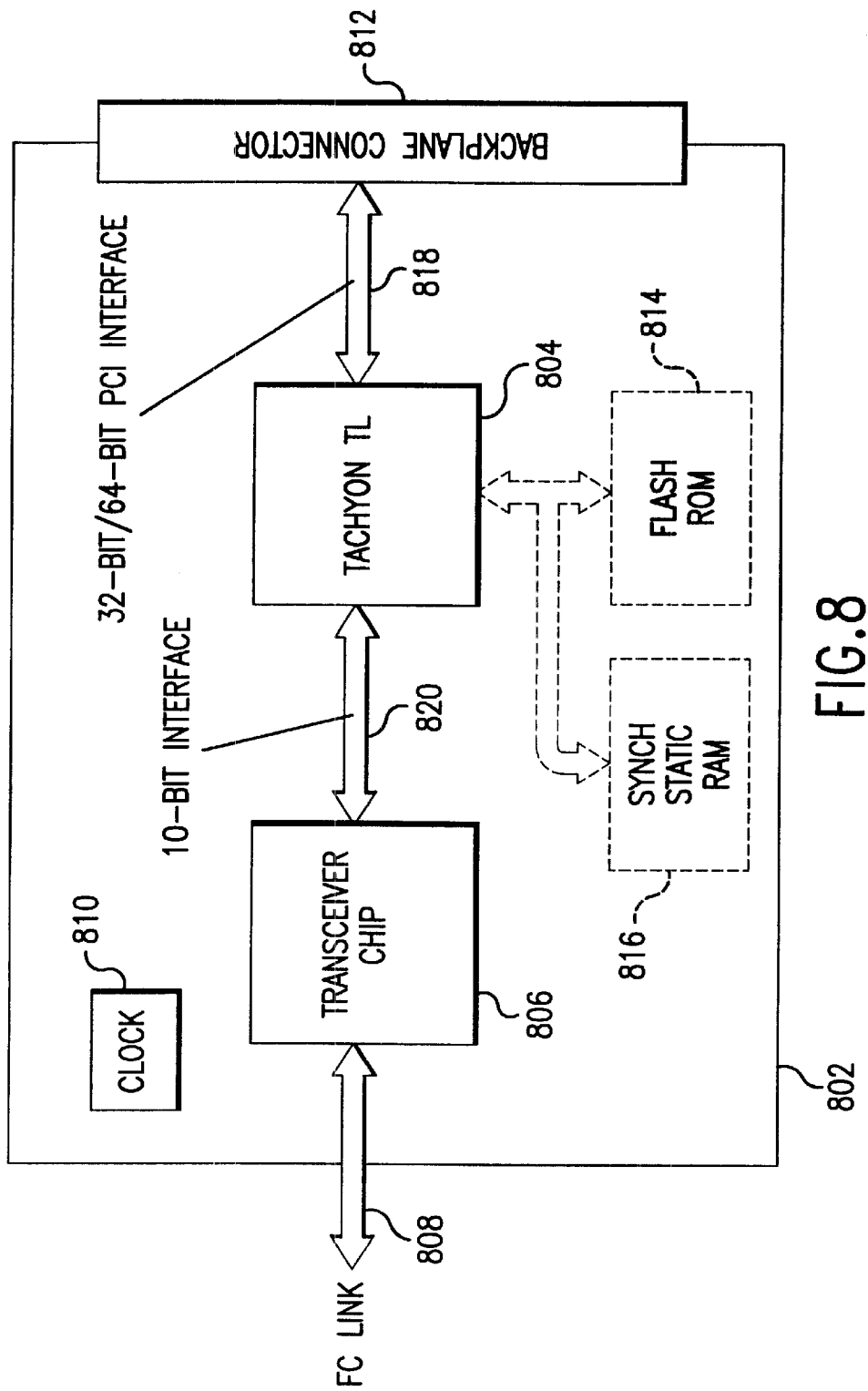
FIG. 8 shows a Tachyon TL Mass Storage Interface Controller incorporated into a typical FC/PCI host adapter.

FIG. 8 shows a TL incorporated into a typical FC/PCI host adapter. The FC/PCI host adapter 802 comprises a TL 804, a transceiver chip 806, an FC link 808, a clock 810, a backplane connector 812, and, optionally, a boot flash ROM 814, or a local synchronous static random access memory ("RAM") 816. The FC host adapter 802 communicates with the processor or processors of an FC node via the backplane connector 812 and a PCI bus within the FC node to which the processor or processors are coupled. The TL 804 is coupled to the backplane connector 812 via a PCI interface 818. The TL sends and receives FC frames to and from an FC arbitrated loop via a 10-bit interface 820 that couples the TL to the transceiver chip 806, which is, in turn, coupled to the FC arbitrated loop via the FC link 808. The clock 810 interfaces to the FC link. The FC host adapter 802 may serve, in terms of the previous discussion, as an NL_Port, and the FC host adapter 802, together with the computer system to which it is coupled via the backplane connector 812, compose an FC node that may be connected via the FC link 808 to an FC arbitrated loop topology.

Figure 9:
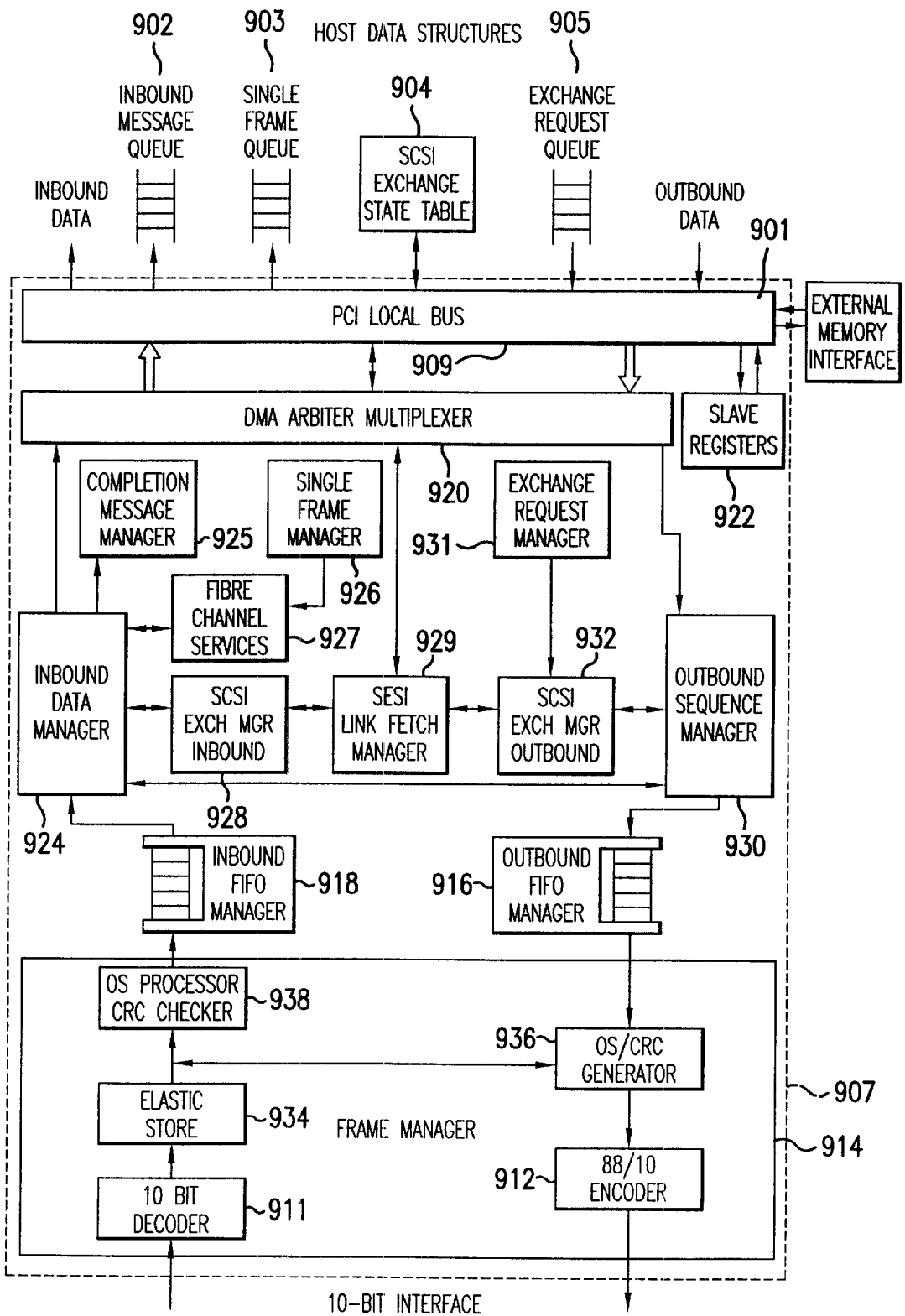
FIG. 9 shows a block diagram description of the Tachyon TL FC Mass Storage Interface Controller and the memory-based data structure interface between the Tachyon TL Mass Storage Interface Controller and the host.

FIG. 9 shows a block diagram description of the TL and the memory-based data structure interface between the TL and the host to which the TL is interconnected by a PCI bus. The memory-based data structures 902–905 are maintained in a memory component of the FC node that is accessible to the TL 907 via the PCI bus 909. In FIG. 9, the TL 907 is represented as being combined with the backplane connector (812 in FIG. 8) and PCI bus 909. The TL interfaces with a transceiver chip (806 in FIG. 8) via a 10 bit/8 bit decoder 911, for receiving inbound frames from the transceiver chip (806 in FIG. 8) and via an 8 bit/10 bit encoder 912 for outbound frames transmitted by the TL to the transceiver chip. The 10 bit/8 bit decoder 911 and 8 bit/10 bit encoder 912 are both subcomponents of the frame manager 914 that receives FC frames for transmission to the transceiver chip (806 in FIG. 8) from the TL via the outbound FIFO manager 916 and that receives a stream of data bits from the transceiver chip (806 in FIG. 8) via the 10 bit/8 bit decoder 911, processes the received data bits into FC frames, and stores the FC frames into the inbound FIFO manager 918. The other frame manager components 934, 936, and 938 buffer received data when the lack of clock synchronization between the transmitter and receiver components of the transceiver chip prevent immediate processing of the received data, generate FCP CRCs, and check FCP CRCs, respectively, The DMA arbiter multiplexer 920 manages multiple internal DMA requests to the PCI local bus and the external memory interface. Internal block arbitration, as well as data path multiplexing, occurs in this block.

The processor or processors of the FC node control and exchange information with the TL by writing and reading various control registers 922 and by placing data into, and removing data from, the memory-based data structures 902–905. Internal components of the TL 924–932 read and write the control registers 922, receive data from, and place into, the memory based data structures 902–905, and exchange FC frames with the frame manager 914 via the inbound FIFO manager 918 and the outbound FIFO manager 916.

The inbound message queue ("IMQ") 902 contains completion messages that notify the host processor or processors of inbound and outbound transaction information and status information. The single frame queue ("SFQ") contains inbound unknown or unassisted FC frames that the TL 907 receives from the frame manager 914 and places into the SFQ. The SCSI exchange state table ("SEST") 904 is shared between the TL and the host and contains SEST entries that each corresponds to a current SCSI exchange (I/O operation). The exchange request queue ("ERQ") 905 contains I/O request blocks ("IRBs") that represent I/O requests sent by the host to the TL.

The completion message manager 925 manages the IMQ and provides queue entries to the inbound data manager 924 into which the inbound data manager places completion messages. The single frame manager 926 manages the SFQ in host memory and provides entries to the fibre channel services component 927 into which the fibre channel component services place inbound frames. The exchange request manager 931 fetches new entries from the ERQ and sends them to the SCSI exchange manger-outbound ("SEM-OUT") for processing. The inbound data manager 924 informs the inbound frame processors, i.e. the SCSI exchange manager-inbound ("SEM-IN") 928 and fibre channel services component 927, of new frames and routes the frames to their proper destination in the host. Also, the inbound data manager sends completion messages to the host via the IMQ. The fibre channel services component 927 manages the fibre channel frames that the SEM-IN 928 does not manage. The fibre channel services component places the frames in the SFQ. The SEM-IN 928 manages the phases of a SCSI exchange that receive a fibre channel sequence. The SEM-IN reads the SEST entries via the SEST link fetch manager 929 and either sends the inbound data to the proper host buffers or sends the request to the SEM-OUT 932 to send the next phases of fibre channel sequence. The SEST link fetch manager 929 is responsible for reading and writing SEST entries, depending upon requests from the SEM-IN 928 and SEM-OUT 932 components. The SEM-OUT 932 manages the phases of a SCSI exchange that require a fibre channel sequence to be sent. The SEM-OUT 932 reads the SEST entries via the SEST link fetch manager 929, builds the request to send those sequences, and sends the requests to the outbound sequence manager 930. The outbound sequence manager ("OSM") 930 processes requests from the SEM-OUT 932 to send fibre channel sequences from the host and retrieves fibre channel frame headers and payloads from the host to send to the remote node. The OSM segments the sequence into fibre channel frames of up to 1 KByte in size and queues them into the outbound FIFO manager 916.

Figure 10:
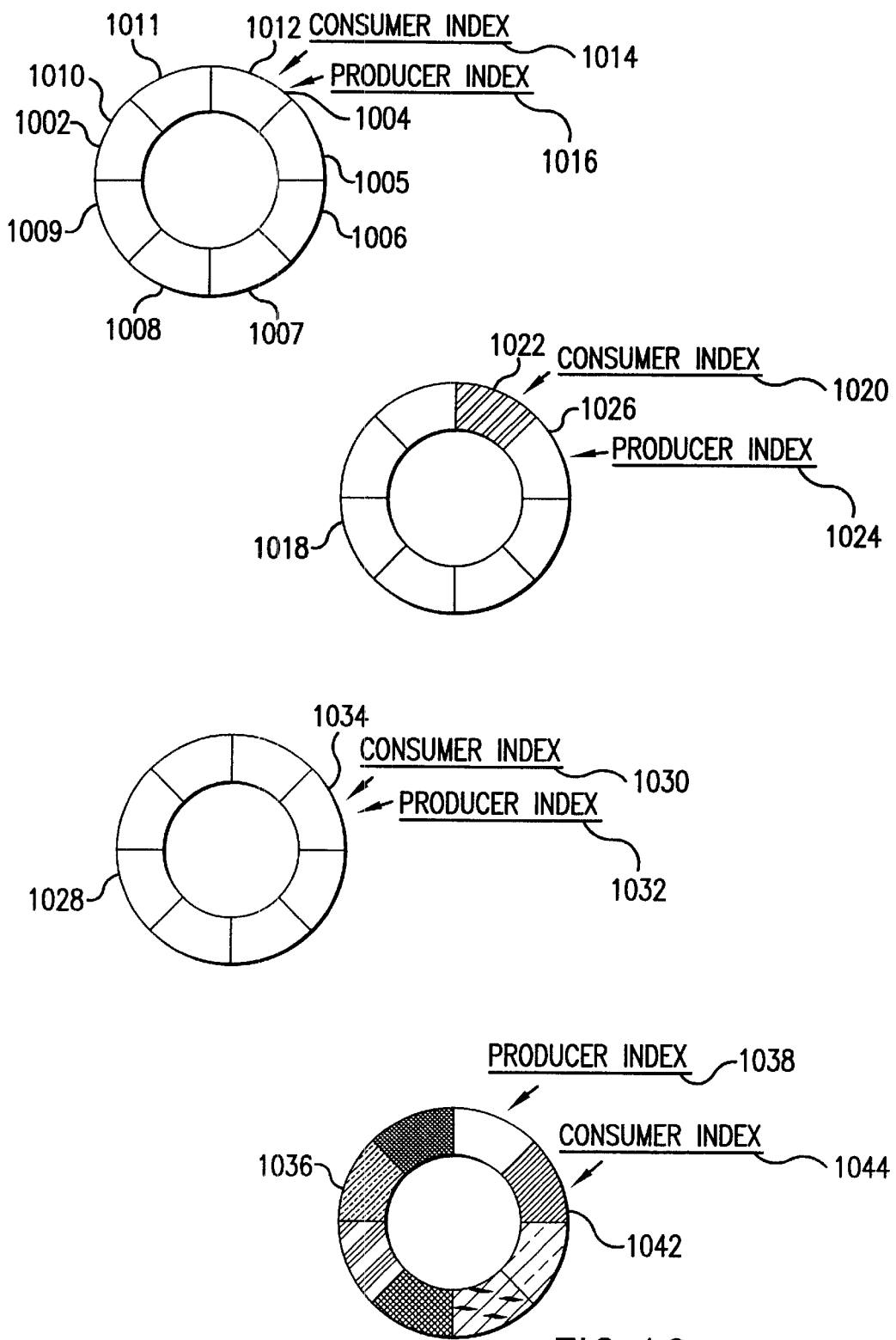
FIG. 10 shows the basic underlying circular queue data structure used in the Tachyon TL Fibre Channel Mass Storage Interface Controller interface.

The IMQ 902, SFQ 903, and ERQ 905 are implemented as circular queues. FIG. 10 shows the basic underlying circular queue data structure used in the TL controller interface. A circular queue is a first-in-first-out ("FIFO") queue that is logically represented in a circular fashion, such as the depiction of the circular queue 1002 at the top of FIG. 10. Each radial section 1004–1012, or slot, of a circular queue contains space for a queue entry, essentially a record-like data structure containing one or more data fields. The circular queue 1002 in FIG. 10 is shown with 8 queue entry slots 1004–1012 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1014 and the producer index 1016 point to the same empty queue entry slot 1012.

When a producer adds a queue entry to an empty circular queue 1002, a circular queue with one valid queue entry 1018 is produced. The consumer index 1020 is not changed, as a result of which the consumer index points to the single valid queue entry 1022 in the circular queue 1018. After the producer inserts the queue entry 1022, the producer increments the producer index 1024 to point to the next available slot 1026 within the circular queue 1018 into which the producer can add a second queue entry. If the consumer now removes the single queue entry 1022, an empty circular queue 1028 is produced. When the consumer has removed the available queue entry 1022, the consumer increments the consumer index 1030. As in the previous depiction of an empty circular queue 1002, the empty circular queue 1028 produced by removing the single queue entry 1022 has both the consumer index 1030 and the producer index 1032 pointing to the same empty, available queue entry slot 1034. If a producer successively adds queue entries at a faster rate than a consumer can consume them, a full circular queue 1036 will eventually be produced. In a full circular queue 1036, the producer index 1038 points to a single empty queue entry slot within the circular queue that immediately precedes the first available valid queue entry 1042 pointed to by the consumer index 1044.

Figure 11:
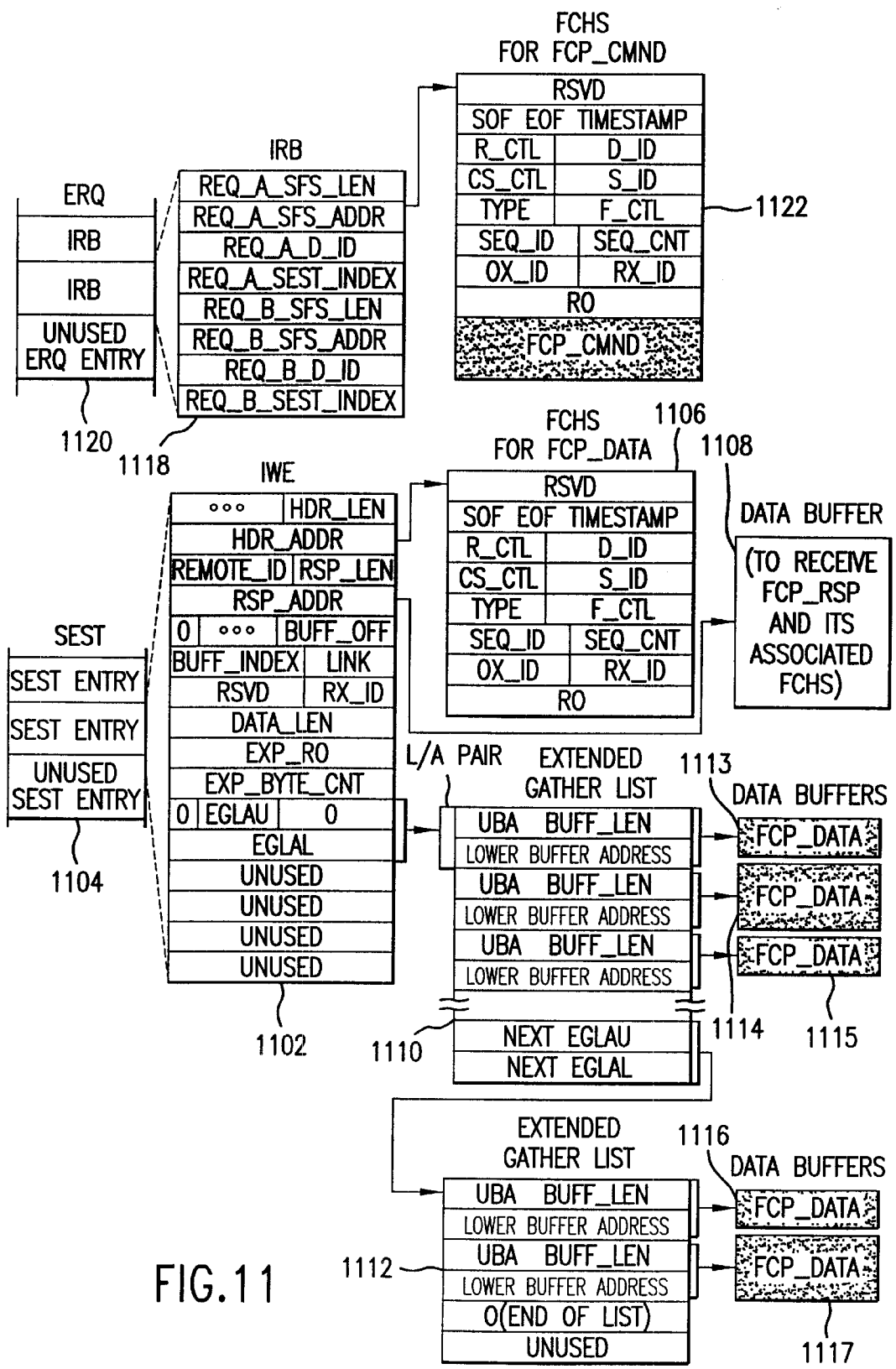
FIG. 11 shows a detailed view of the host memory data structures required to perform an initiated FC Protocol for SCSI write operation from four or more data buffers.

FIG. 11 shows a more detailed view of the host memory data structures required to perform an FCP write operation where the FC node in which a TL resides is the initiator of the FCP write operation and where the data payload that will include the data to be written requires 4 or more data buffers. The host prepares an initiator write entry ("IWE") 1102 within a SEST entry 1104 in the SEST (904 in FIG. 9). Associated with the IWE are: (1) a fibre channel header structure ("FCHS") 1106 that is used to send the FCP_DATA sequence; (2) a data buffer 1108 that is used to receive the FCP_RSP frame from the SCSI target; and (3) one or more extended scatter gather list ("SGL") pages 1110 and 1112 that contain pointers to data buffers 1113–1117 in which the host places the data to be written to the SCSI target via the FCP_DATA sequence. The host then creates an I/O request block ("IRB") 1118 in an unused ERQ entry 1120 and associates the IRB with an FCHS 1122 that is used for the FCP_CMND sequence. The host then increments the ERQ producer index. The producer index increment is detected by the TL, and the TL then launches the FCP write operation. The TL uses the information and data stored within the IRB 1118 and RWE 1102, and the data structures associated with the IRB and RWE, to conduct the entire FCP write operation, including the FCP_CMND sequence, the FCP_XFER_RDY sequence, and the FCP_DATA sequence. The TL receives from the target a FCP_RSP sequence at the completion of the FCP write operation.

Figure 12:
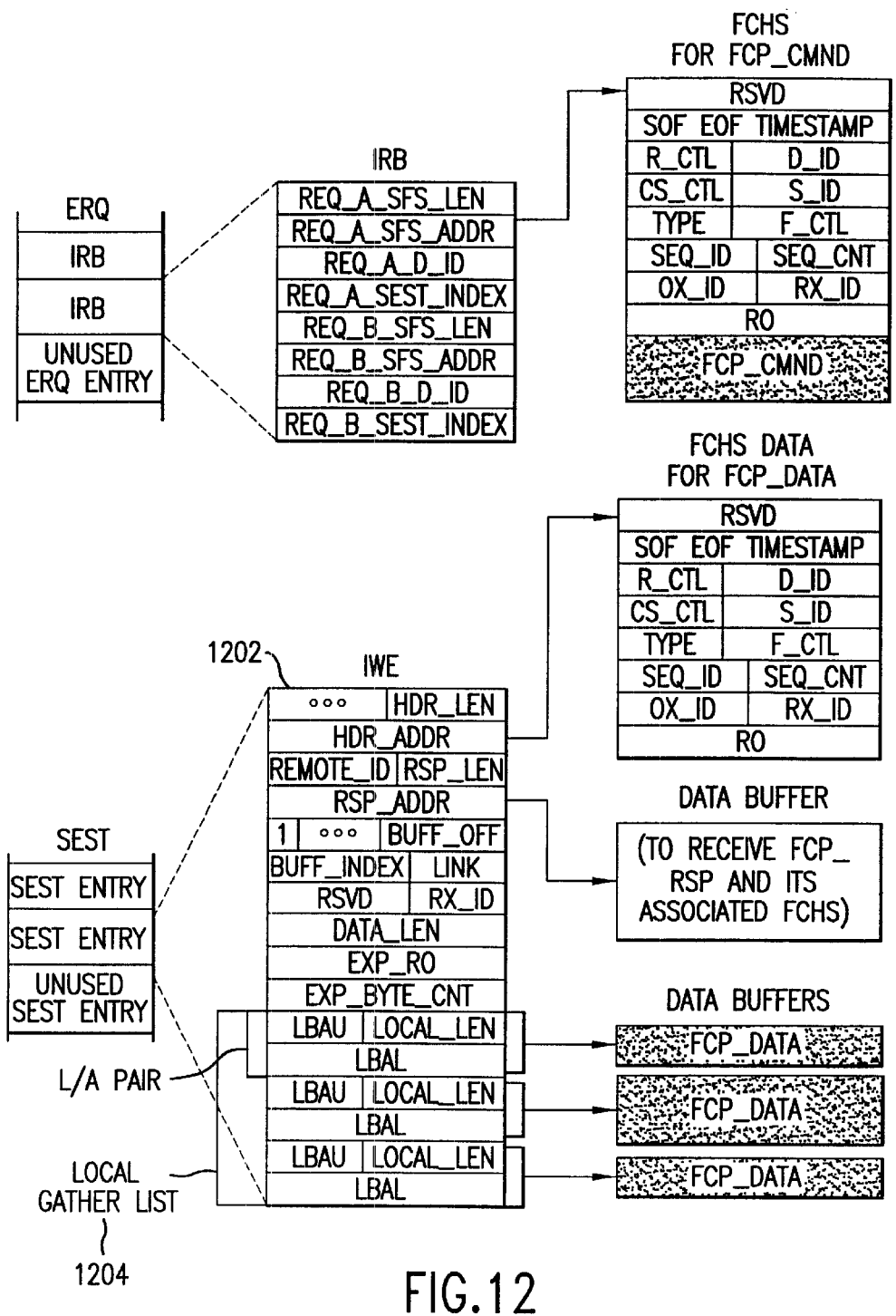
FIG. 12 shows the host memory data structures required to perform an initiated FC Protocol for SCSI write operation from three or less data buffers.

FIG. 12 shows the host memory data structures required to perform an FCP write operation where the FC node within which the TL resides is the initiator of the FCP write operation and the data payload of the FCP_DATA sequence can fit into three or fewer data buffers. The data structure shown in FIG. 12 are similar to those shown in FIG. 11 with the exception that, rather than having extended SGL pages (1110 and 1112 in FIG. 11) external from the IWE (1102 in FIG. 11), the IWE 1202 in FIG. 12 includes a local SGL 1204 that is included within the IWE 1202. Otherwise, the operations carried out by the TL in response to the incrementing of the ERQ producer index by the host are analogous to those carried out for the FCP write operation described above with reference to FIG. 11.

Figure 13:
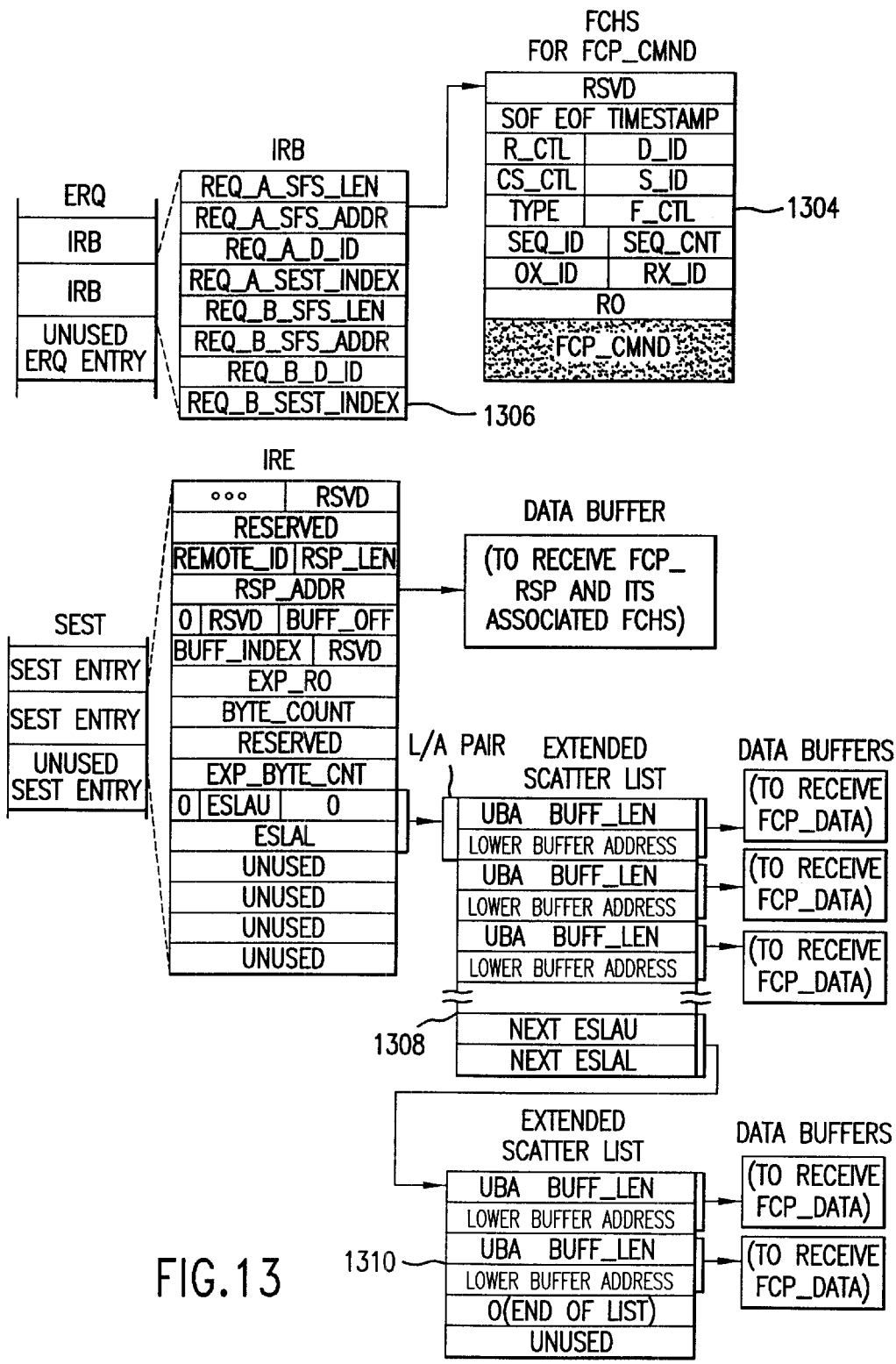
FIG. 13 shows the host memory data structures used to perform an initiated FC Protocol for SCSI read operation to more than three data buffers.

FIG. 13 shows the host memory data structures used to perform an FCP read operation where the FC node in which the TL resides is the initiator of the read operation and the data to be read will fill more than three data buffers. These data structures are similar to those shown in FIG. 11, with the following exceptions: (1) rather than an IWE (1102 in FIG. 11), the SEST entry created by the host contains an initiator read entry ("IRE"); (2) there is no FCHS for the FCP_DATA sequence (1106 in FIG. 11); and (3) the FCHS for the FCP_CMND sequence 1304 associated with the IRB 1306 contains a read command, rather than a write command as in the case of the FCHS (1122 in FIG. 11) for the write operation. As with the write operation, the host updates the ERQ producer index in order to initiate the read operation, and the TL uses the information stored in the data structures in FIG. 13 to conduct the FCP_CMND sequence and the FCP_DATA sequences, and receives the FCP_RSP sequence from the target SCSI device at the conclusion of the read operation.

Figure 14:
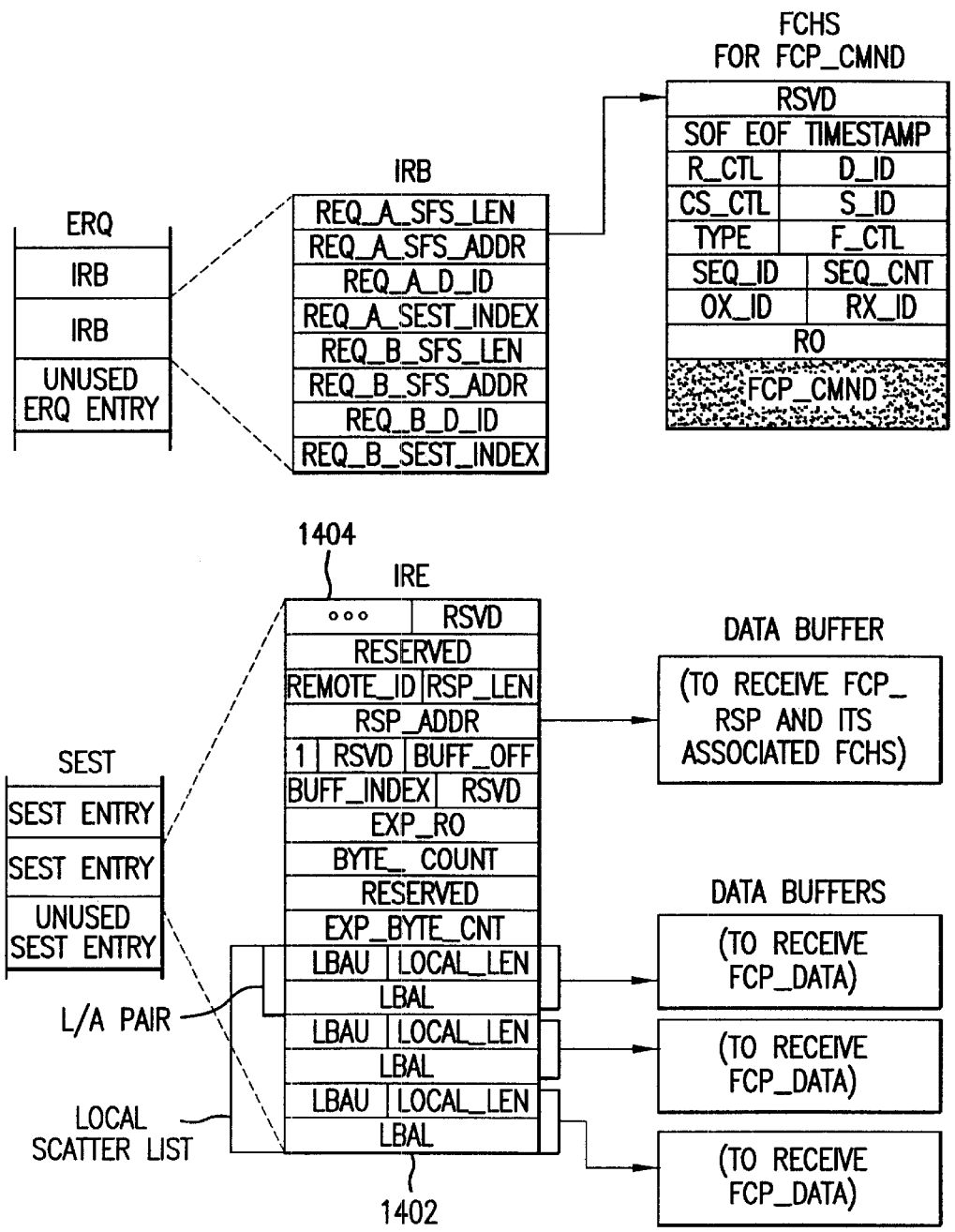
FIG. 14 shows the data structures required to perform an initiated FC Protocol for SCSI read operation to three or fewer data buffers.

FIG. 14 shows the data structures required to perform the FCP read operation where the FC node in which the TL resides is the initiator of the operation and where the data to be received can fit into three or fewer data buffers. FIG. 14 bears the same relationship to FIG. 13 as FIG. 12 bears to FIG. 11. Instead of the external extended FCL pages (1308 and 1310 in FIG. 13), a local SGL 1402 is included within the IRE 1404. Otherwise, the operations conducted by the TL in order to complete the FCP read operation are identical with those discussed with reference to FIG. 13.

Figure 15:
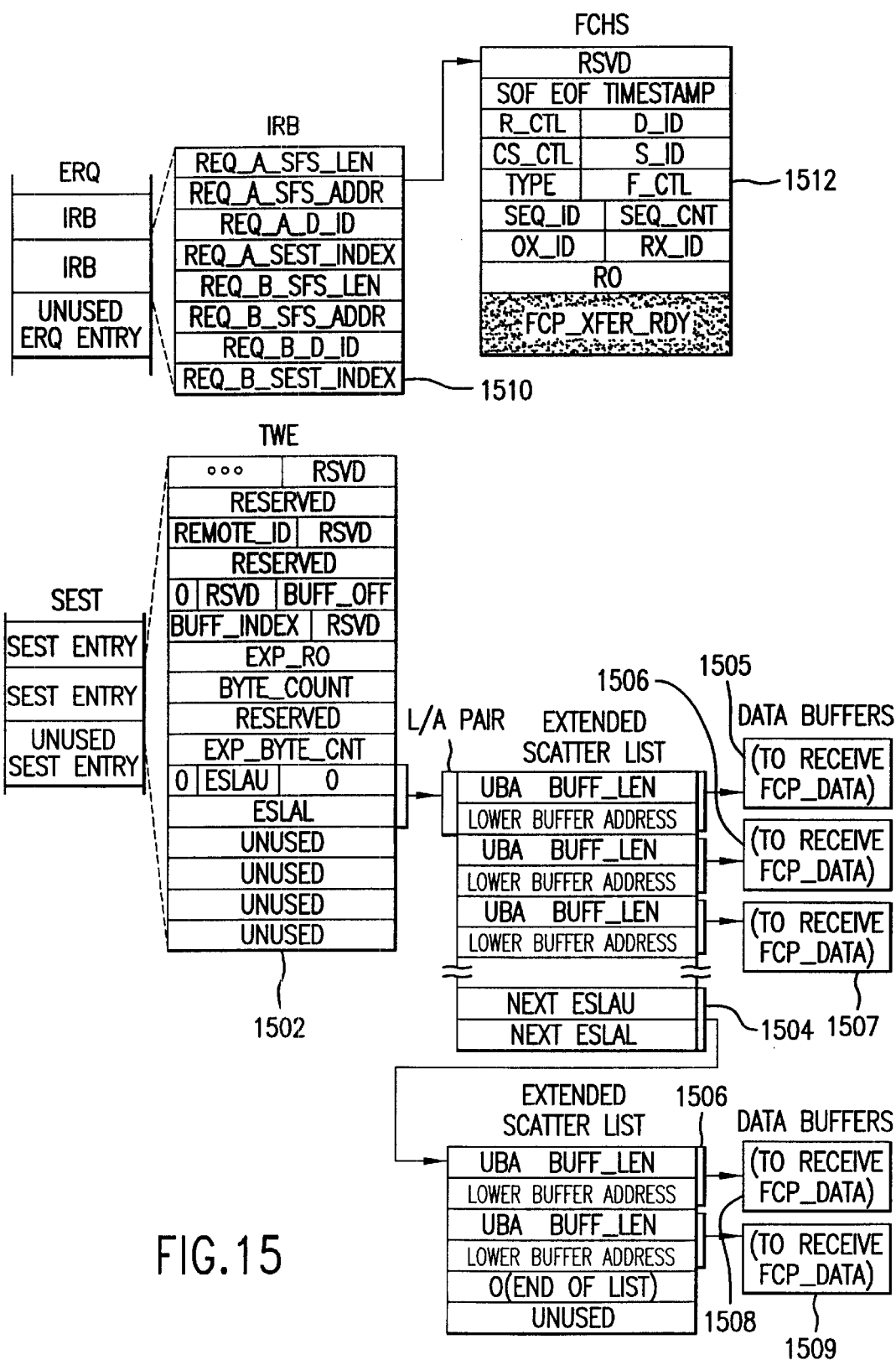
FIG. 15 shows the host memory data structures required for an FC node that is the target of an FC Protocol for a SCSI write operation initiated by another FC node to more than three data buffers.

FIG. 15 shows the host memory data structures required for an FC node that is the target of a FCP write operation initiated by another FC node to carry out the indicated FCP write operation at the FC target node. When the TL in the FCP target node receives a FCP_CMND frame from the FC initiator node, the TL places it into the SFQ (903 in FIG. 9) and notifies the host via an inbound completion message. Upon receiving the inbound completion message, the host allocates and fills in the data structures shown in FIG. 13. These include the target write entry ("TWE") 1502 which is associated with one or more external extended SGL pages 1506 and 1506. These external extended SGL pages are, in turn, associated with data buffers 1505–1509 in which the data transferred from the FC initiator node will be placed after being extracted from the FCP_DATA sequence. The host also creates an IRB 1510 associated with an FCHS 1512 for the FCP_XFER_RDY sequence that will be transmitted back to the FC initiator node in order to elicit the FCP_DATA sequence. The host initiates sending of the FCP_XFER_RDY sequence and subsequent reception of the write data by updating the ERQ producer index register.

Figure 16:
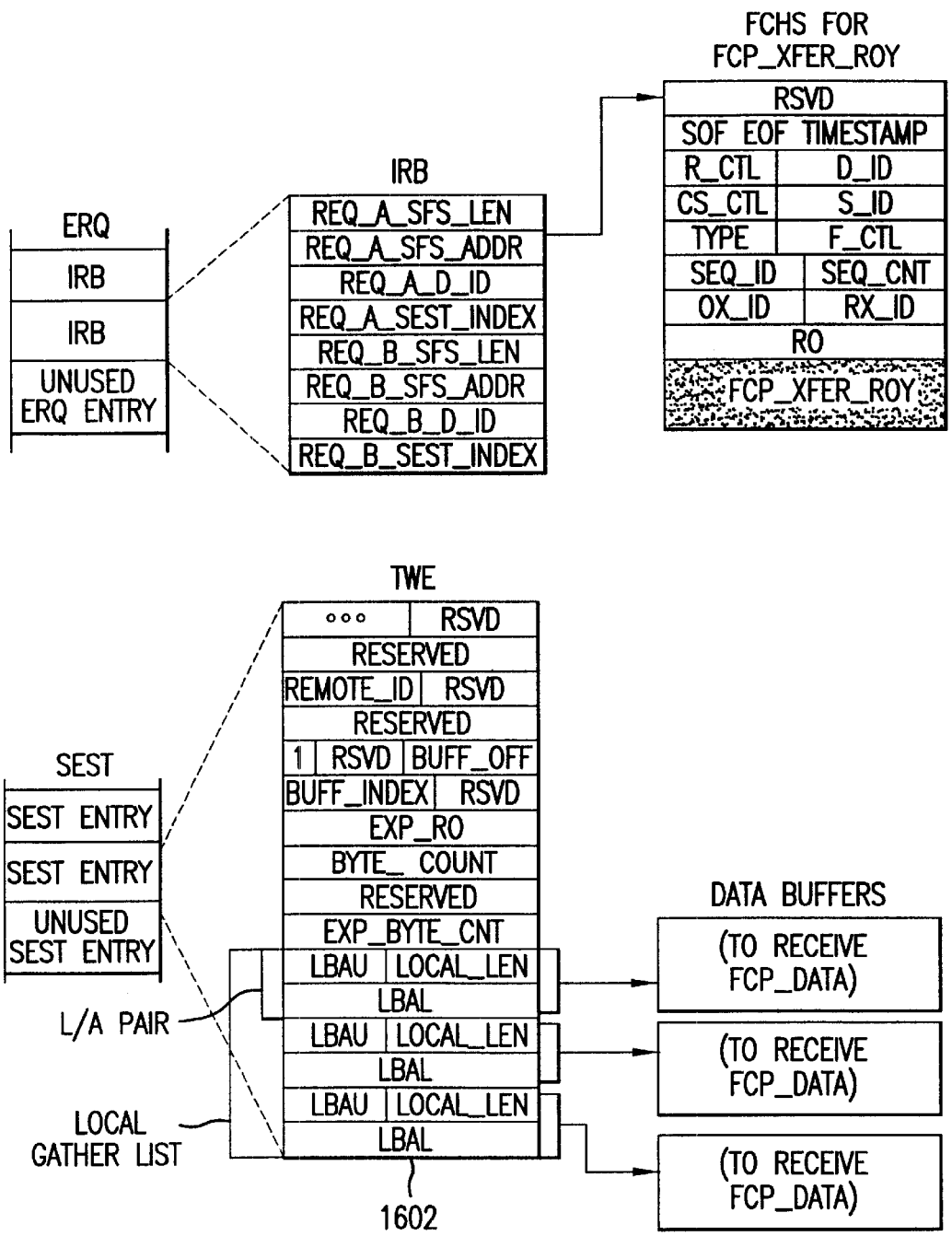
FIG. 16 shows the host memory data structures required for an FC node that is the target of an FC Protocol for a SCSI write operation initiated by another FC node to three or fewer data buffers.

FIG. 16 bears the same relationship to FIG. 15 as FIG. 12 bears to FIG. 11 and FIG. 14 bears to FIG. 13 showing the host memory structures for a targeted FCP write operation employing a SGL. The only essential difference between FIGS. 15 and 16 are that the external extended SGL pages (1504 and 1506 in FIG. 15) are replaced by a local SGL 1602.

Figure 17:
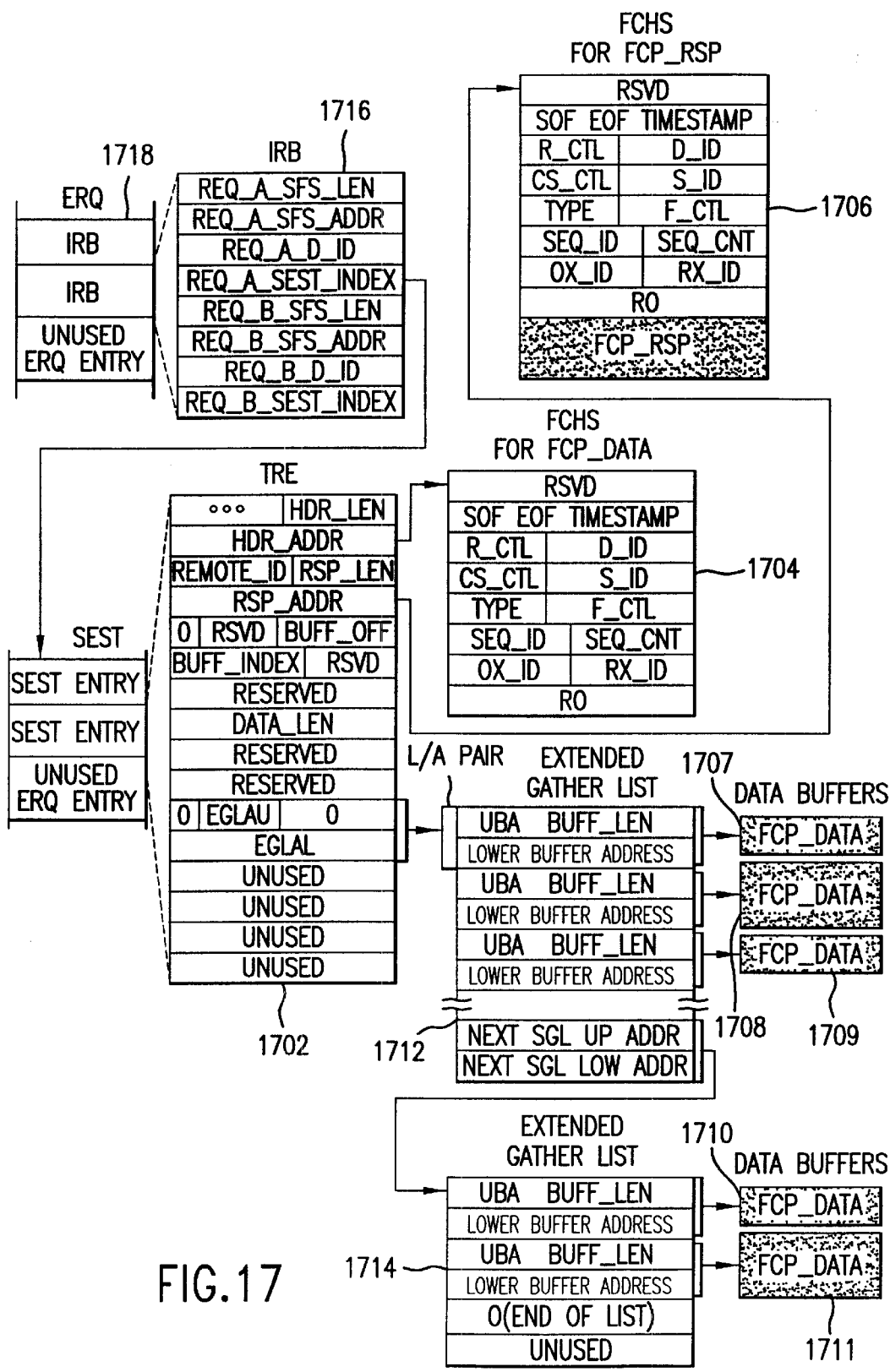
FIG. 17 shows the host memory data structures required for an FC target node to carry out a read operation initiated by an FC initiator node from more than three data buffers.

FIG. 17 shows the host memory data structures required for an FC target node to carry out a read operation initiated by an FC initiator node. These data structures are similar to the data structures required by an FC target node to respond to an FCP write operation, shown in FIG. 15, with the following exceptions: (1) there is no FCHS for a FCP_XFER_RDY operation (1512 in FIG. 15) since no FCP_XFER_RDY sequence is involved; (2) the TWE (1502 in FIG. 15) is replaced in FIG. 17 with a target read entry ("TRE") 1702; and (3) an FCHS for an FCP_DATA sequence 1704 and an FCHS for an FCP_RSP sequence 1706 are both associated with the TRE 1702. When the TL receives an FCP_CMND frame from the FC initiator node, the TL places the FCP_CMND frame into the SFQ (903 in FIG. 9) and notifies the host via an inbound completion message. When the host is notified by the inbound completion message, it interprets the contents of the FCP_CMND frame and sets up the data structures in FIG. 17 in order to respond to the SCSI read command represented by the FCP_CMND frame. The host creates in an unused SEST entry a TRE 1702 data structure and associates with the TRE 1702 the FCHS for the FCP_DATA sequence 1704 and the FSHS for the FCP_RSP sequence 1706. The host also allocates a number of data buffers that the host fills via a SCSI read operation and that will be transferred in the subsequent FC_DATA sequence back to the FC initiator node. These data buffers 1707–1711 are referenced by one or more external extended SGL pages 1712 and 1714. The host also creates an IRB 1716 in an unused ERQ entry 1718. By updating the ERQ producer index, the host initiates the return of data solicited by the FCP read operation, mediated by the TL, resulting in sending by the FC target node the FCP_DATA sequences containing the data read from the SCSI device and a final FCP_RSP sequence indicating completion of the read command.

Figure 18:
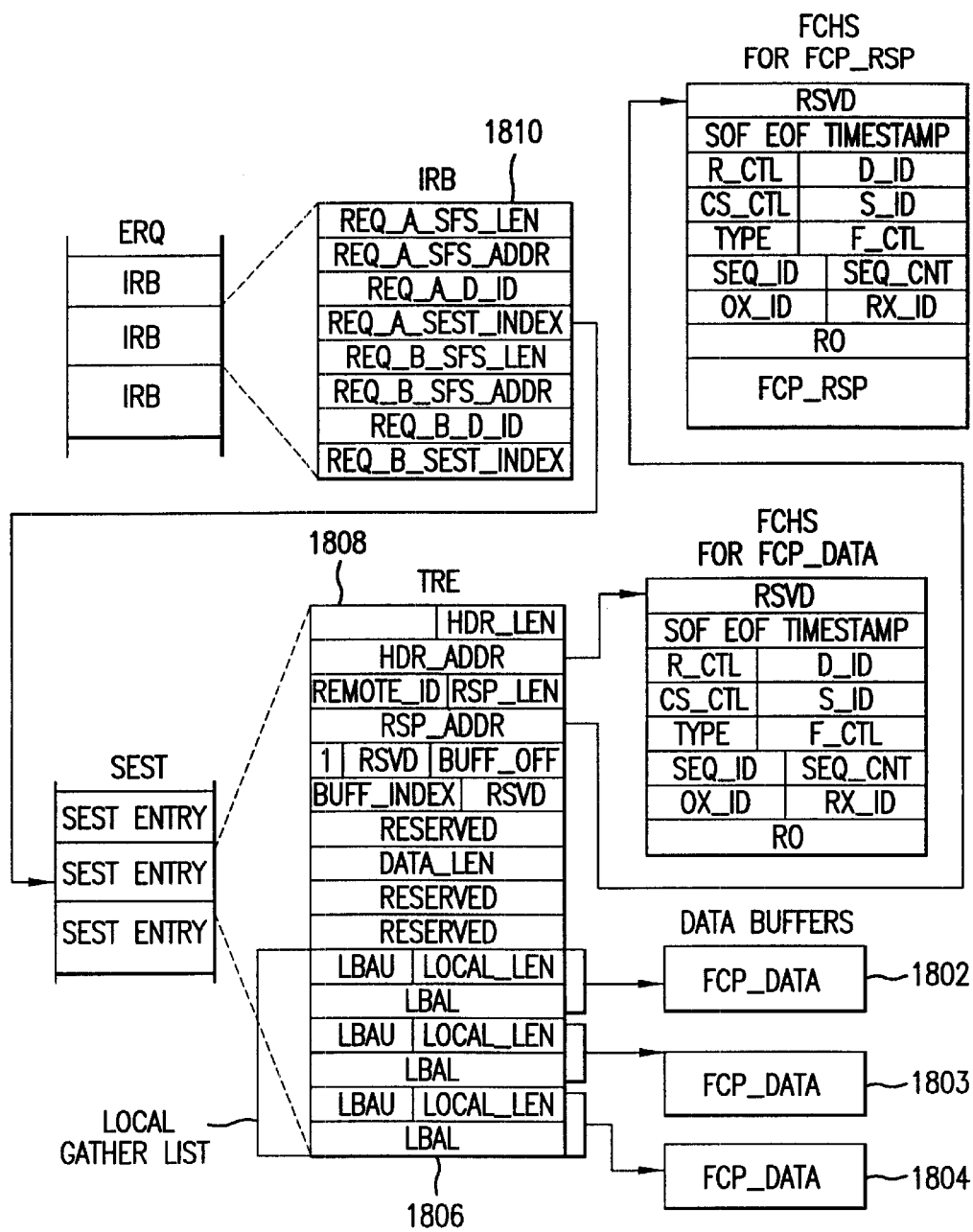
FIG. 18 shows the host memory data structures required for an FC target node to carry out a read operation initiated by an FC initiator node from three or less data buffers.

FIG. 18 bears the same relationship to FIG. 17 as FIGS. 12, 14 and 16 bear to FIGS. 11, 13 and 15, respectively. The operations carried out by the TL in order to respond to an FCP read request are the same as those discussed with reference to FIG. 17. The only difference in FIG. 18 is that the data buffers that contain the data read from the SCSI device 1802–1804 are referenced from a local SGL 1806 included within the TRE 1808.

Arbitrated Loop Initialization

As discussed above, the FC frame header contains fields that specify the source and destination fabric addresses of the FC frame. Both the D_ID and the S_ID are 3-byte quantities that specify a three-part fabric address for a particular FC port. These three parts include specification of an FC domain, an FC node address, and an FC port within the FC node. In an arbitrated loop topology, each of the 127 possible active nodes acquires, during loop initialization, an arbitrated loop physical address ("AL_PA"). The AL_PA is a 1-byte quantity that corresponds to the FC port specification within the D_ID and S_ID of the FC frame header. Because there are at most 127 active nodes interconnected by an arbitrated loop topology, the single byte AL_PA is sufficient to uniquely address each node within the arbitrated loop.

Figure 19:
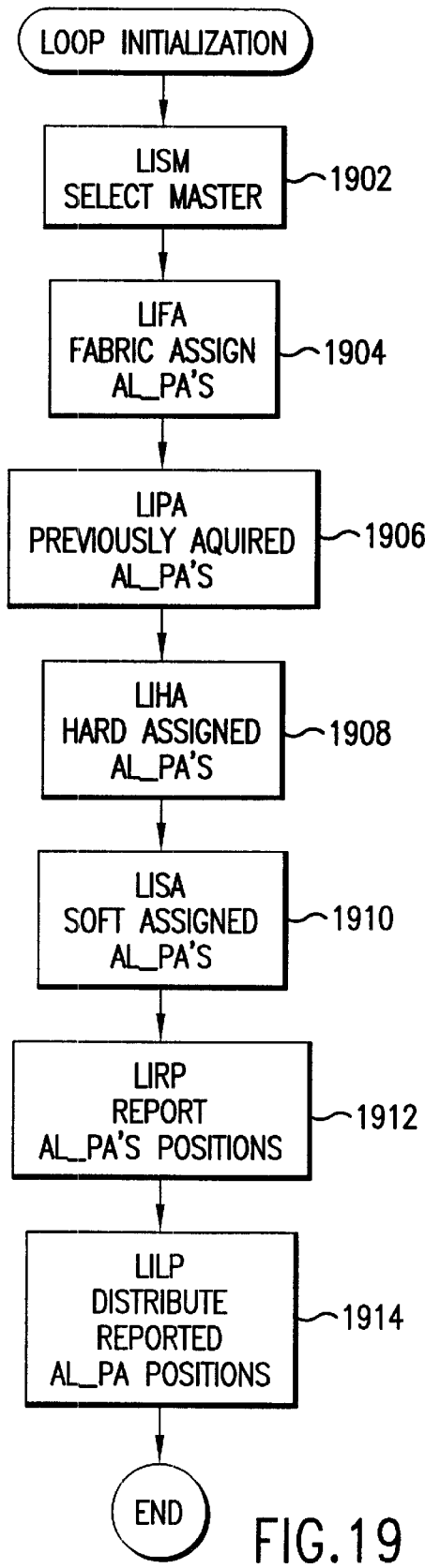
FIG. 19 shows a diagram of the seven phases of FC arbitrated loop initialization.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 19 shows a diagram of the seven phases of FC arbitrated loop initialization. FIG. 20 shows the data payload of FC frames transmitted by FC nodes in an arbitrated loop topology during each of the seven phases of loop initialization shown in FIG. 19. The data payload for the FC frames used in each of the different phases of loop initialization comprises three different fields, shown as columns 2002–2004 in FIG. 20. The first field 2002 within each of the different data payload structures is the LI_ID field. The LI_ID field contains a 16-bit code corresponding to one of the seven phases of group initialization. The LI_FL field 2003 for each of the different data payload layouts shown in FIG. 20 contains various flags, including flags that specify whether the final two phases of loop initialization are supported by a particular FC port. The TL supports all seven phases of loop initialization. Finally, the data portion of the data payload of each of the data payload layouts 2004 contains data fields of varying lengths specific to each of the seven phases of loop initialization. In the following discussion, the seven phases of loop initialization will be described with references to both FIGS. 19 and 20.

In the first phase of loop initialization 1902, called "LISM," a loop initialization master is selected. This first phase of loop initialization follows flooding of the loop with loop initialization primitives ("LIPs"). All active nodes transmit an LISM FC arbitrated loop initialization frame 2006 that includes the transmitting node's 8-byte port name. Each FC port participating in loop initialization continues to transmit LISM FC arbitrated loop initialization frames and continues to forward any received LISM FC arbitrated loop initialization frames to subsequent FC nodes in the arbitrated loop until either the FC port detects an FC frame transmitted by another FC port having a lower combined port address, where a combined port address comprises the D_ID, S_ID, and 8-byte port name, in which case the other FC port will become the loop initialization master ("LIM"), or until the FC port receives back an FC arbitrated loop initialization frame that FC port originally transmitted, in which case the FC port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 1904, in which any node having a fabric assigned AL_PA can attempt to acquire that AL_PA. The LIM transmits an FC arbitrated loop initialization frame having a data payload formatted according to the data payload layout 2008 in FIG. 20. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC port within the arbitrated loop, each FC node also sets a bit in the bit map to indicate that FC nodes fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 1906, the LIM transmits an FC frame containing a data payload formatted according to the data layout 2010 in FIG. 20. The data field contains the AL_PA bit map returned to the LIM during the previous LIPA phase of loop initialization. During the LIPA phase 2010, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 1908 and LISA 1910 are analogous to the above-discussed LIPA phase 1906. Both the LIHA phase 1908 and the LISA phase 1910 employ FC frames with data payloads 2012 and 2014 similar to the data layout for the LIPA phase 2010 and LIFA phase 2008. The bit map from the previous phase is recirculated by the LIM in both the LIHA 1908 and LISA 1910 phases, so that any FC port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC ports in the arbitrated loop topology. If an FC port is not able to acquire an AL_PA at the completion of the LISA phase 1910, then that FC port may not participate in the arbitrated loop. The FC-AL-2 standard contains various provisions to enable a nonparticipating node to attempt to join the arbitrated loop, including restarting the loop initialization process.

In the LIRP phase of loop initialization 1912, the LIM transmits an FC frame containing a data payload having the data layout 2016 in FIG. 20. The data field 2017 of this data layout 2016 contains a 128-byte AL_PA position map. The LIM places the LIM's acquired AL_PA, if the LIM has acquired an AL-PA, into the first AL-PA position within the AL_PA position map, following an AL_PA count byte at byte 0 in the data field 2017, and each successive FC node that receives and retransmits the LIRP FC arbitrated loop initialization frame places that FC node's AL_PA in successive positions within the AL_PA position map. In the final loop initialization phase LILP 1914, the AL_PA position map is recirculated by the LIM through each FC port in the arbitrated loop topology so that the FC ports can acquire, and save in memory, the completed AL_PA position map. This AL_PA position map allows each FC port within the arbitrated loop to determine its position relative to the other FC ports within the arbitrated loop.

Hardware Implementation of the Fibre Channel Loop Map Initialization Protocol The TL implements all phases of FC arbitrated loop initialization in hardware. Although the present invention applies to all phases of arbitrated loop initialization, the present invention will be discussed explicitly with regard to the final two phases of arbitrated loop initialization, LIRP and LILP, involving construction and distribution of an AL_PA position map. The final two phases of arbitrated loop initialization involve exchange of the largest FC arbitrated loop initialization frames, and thus place the greatest constraints on a hardware implementation.

Figure 21:
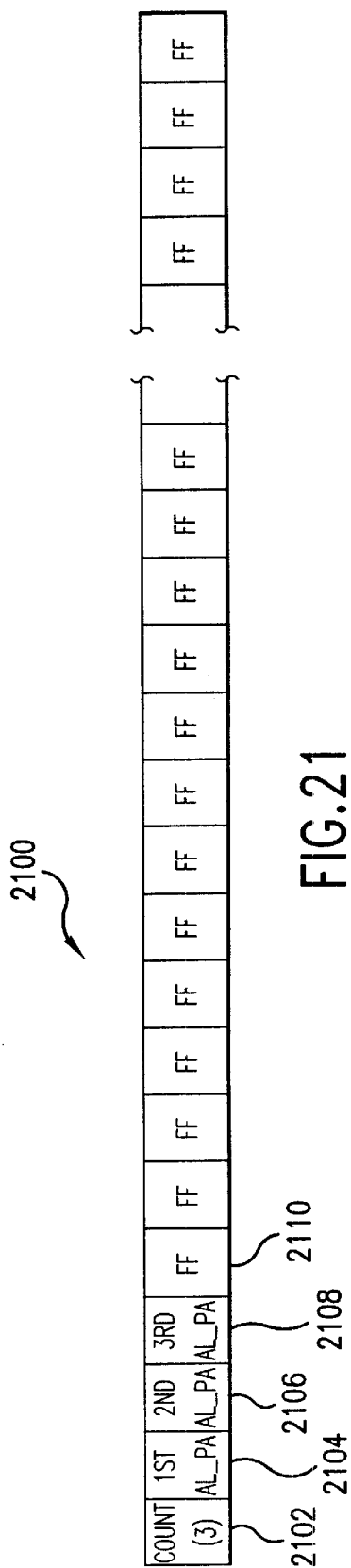
FIG. 21 shows the 128-byte AL_PA position map that is included in the data field of the LIRP and LILP arbitrated loop initialization frame data payload.

FIG. 21 shows the 128-byte AL_PA position map that is included in the data field of the LIRP and LILP FC arbitrated loop initialization frame data payloads. FIG. 21 is thus a more detailed view of the data fields 2017 and 2019 in the data payload layouts 2016 and 2018, respectively, of FIG. 20. The AL_PA position map includes, as its first byte, a count 2102 of the number of AL_PAs within the AL_PA position map 2100. Following the count are, in order starting with the AL_PA of the LIM 2104, if the LIM has acquired an AL_PA during arbitrated loop initialization, the AL_PAs of the remaining FC ports within the arbitrated loop that have acquired AL_PAs during arbitrated loop initialization. For example, in FIG. 21 there are three AL_PAs in the AL_PA position map. The first AL_PA 2104 is that of the LIM. The following two AL_PAs 2106 and 2108 are the AL_PAs of the next two FC ports in the FC arbitrated loop following the LIM that have acquired AL_PAs during loop initialization. An FC frame containing an AL_PA position map is constructed by the LIM and then circulated via the FC arbitrated loop through each FC port within the arbitrated loop. Each FC port within the arbitrated loop that has acquired an AL_PA during the previous arbitrated loop initialization phases increments the count 2102 and adds its AL_PA in the first available position in the AL_PA position map 2100. Available positions contain the unsigned character, or byte, 0xFF. The available bytes are initialized to 0xFF by the LIM. Thus, during the LIRP phase of loop initialization, the participating FC ports within the arbitrated loop each enter their AL_PA into the AL_PA position map, which is finally forwarded back to the LIM. During the LILP phase of loop initialization, the LIM recirculates the completed AL_PA position map through the arbitrated loop so that participating FC ports can place the AL_PA position map into a host memory structure for later reference by the FC nodes that contain the FC ports. The AL_PA position map is useful for intelligently and efficiently handling error conditions that may later occur within the arbitrated loop.

If the LIRP and LILP phases of loop initialization were implemented in a store and forward manner, then the entire AL_PA position map would need to be stored within a memory buffer of the TL. A memory buffer this size is both expensive and complicates the design of the TL. However, several observations have led to the method of the present invention for implementing the LIRP and LILP of loop initialization in hardware without requiring a large memory buffer.

Figure 22:
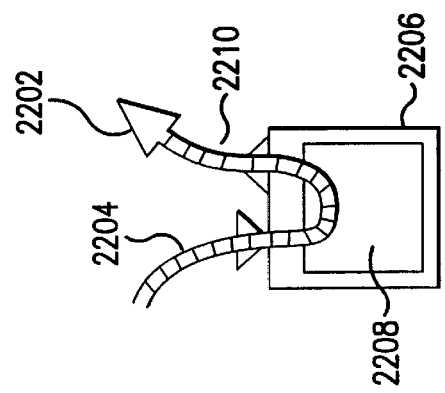
FIG. 22 illustrates the inherent buffering capacity of a single FC port.

The first of these observations concerns the inherent buffering capacity of the FC ports interconnected by the FC arbitrated loop. FIG. 22 illustrates the inherent buffering capacity of a single FC port. As a stream of data 2202 received by the receiver component 2204 of an FC port 2206 is processed by the interface controller 2208 within the FC port 2206, and transmitted onto the next FC port by the transmitter component 2210, and when the reception, processing, and transmission is carried out at the fastest possible rate, at least 12 bytes of data will reside within the various components of the FC port 2206 at any given instance. These components include the serializer/deserializer receiver, the data latch, the elastic store, the logic circuitry , and the transmitter.

Figure 23:
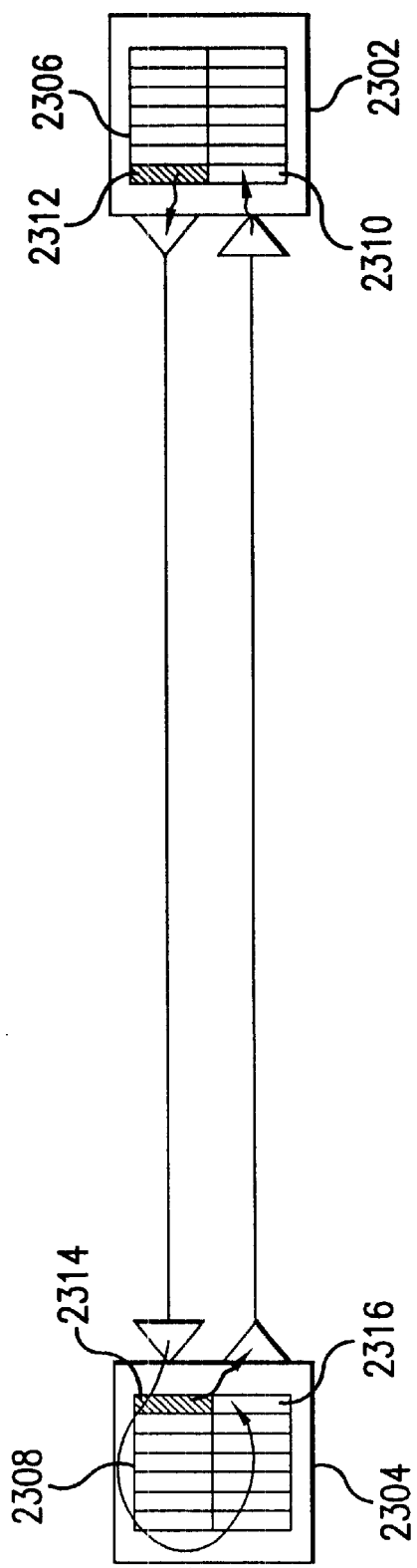
FIG. 23 illustrates the inherent buffering within a 2-port arbitrated loop

FIG. 23 illustrates the inherent buffering within a 2-port arbitrated loop. The FC ports 2302 and 2304 are each shown to contain memory buffers 2306 and 2308, respectively, each storing portions of two FC arbitrated loop initialization frames in 12 byte sections, as, for example, section 2310. One FC port 2302 has transmitted the first 12-byte section 2310 of an FC frame to the second FC port 2304 and has begun to transmit the second 12-byte section 2312 to the second FC port 2304. In the meantime, the second FC port 2304 has received the first 12-byte section 2314 of the FC frame from the first FC port 2302 and is currently receiving the second 12-byte section 2316 of the FC frame from the first FC port 2302. However, the second FC port 2304 is processing the received information as quickly as possible and is forwarding the FC frame back to the first FC port 2302. Thus, the second FC port 2304 has begun to transmit the first received 12-byte section 2314 of the FC frame back to the first FC port 2302, where it is over writing the first 12-byte section 2310 within the memory buffer 2306 of the first FC port 2302. Thus, in this case, the first FC port 2302 can depend on only 12 bytes of inherent buffering in the arbitrated loop as a whole. In order to both send an FC frame to the second FC port 2304 and to receive a perhaps modified FC frame simultaneously back from the second FC port 2304, the first FC port 2302 will need to have sufficient memory buffer to buffer all but 12 bytes of the received FC frame.

Figure 24:
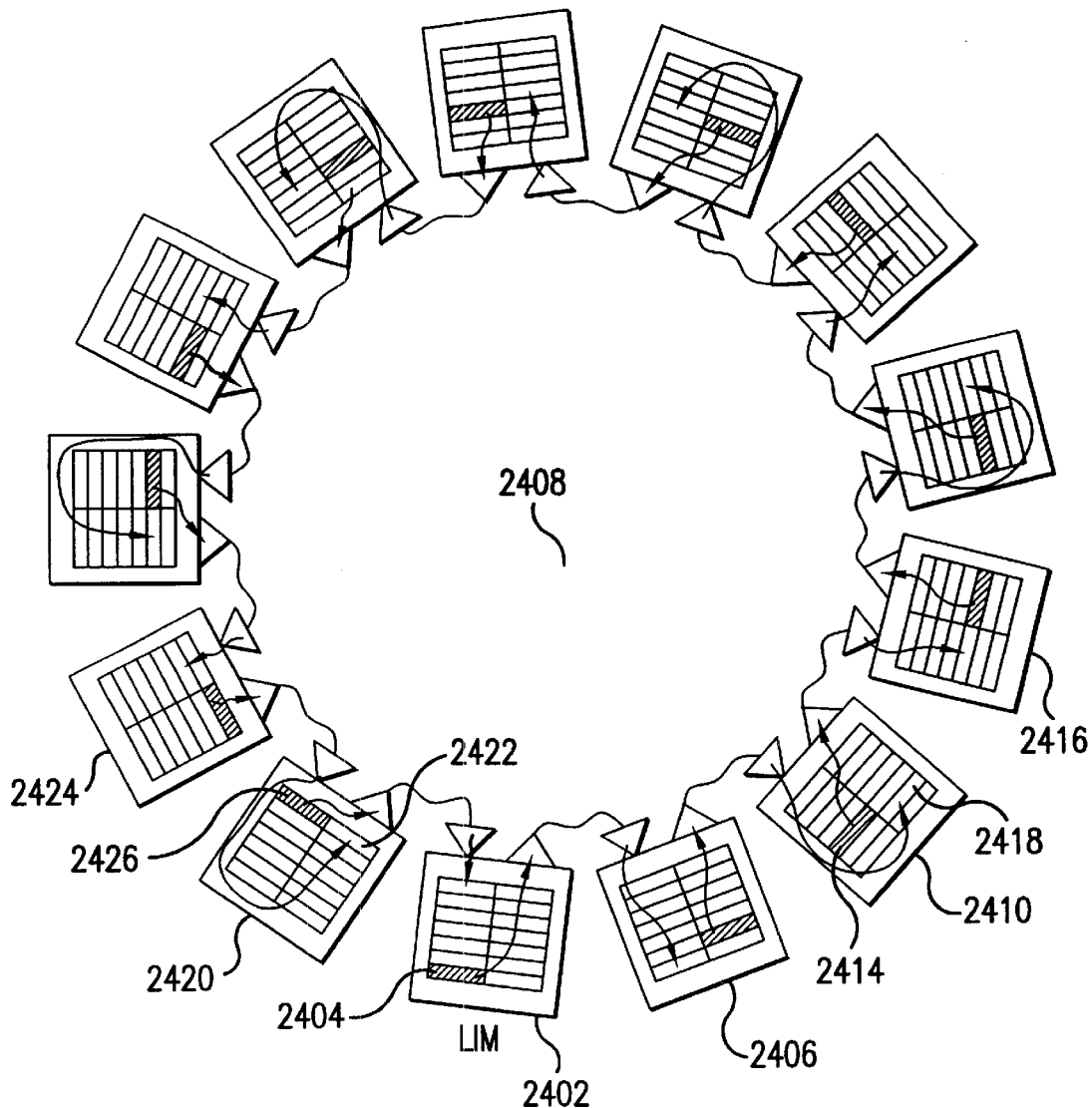
FIG. 24 shows a 13-port arbitrated loop in which an FC frame is being circulated.

FIG. 24 shows a 13-port arbitrated loop in which an FC frame is being circulated. The LIM 2402 is sending the last 12-byte section 2404 of a 13-section FC frame to the next FC port 2406 in the arbitrated loop 2408. That next FC port 2406 has already received the first twelve 12-byte sections from the LIM 2402. That next FC port 2406 is processing and forwarding the FC frame received from the LIM 2402 as quickly as possible and is thus transmitting the twelfth 12-byte section to the next FC port 2410 of the arbitrated loop 2408. This third FC port 2410 has also been processing and forwarding the FC frame as quickly as possible, and is thus currently forwarding the eleventh 12-byte section 2414 to the fourth FC port 2416 at the same time that the third FC port 2410 is receiving the twelfth 12-byte section 2418 from the second FC port 2406. Following this paradigm in a counter-clockwise direction around the arbitrated loop, the thirteenth FC port 2420 is currently receiving the second 12-byte section 2422 from the twelfth FC port 2424 while simultaneously forwarding the first 12-byte section 2426 to the LIM 2402. Thus, because of the 12-byte inherent buffering within each FC port of the arbitrated loop 2408, the LIM needs only a total of 12 bytes of internal buffering in order to create and transmit an FC frame and to receive that FC frame back after it travels through each FC port of the arbitrated loop 2408. Thus, when there is a sufficient number of FC ports in an arbitrated loop, very little internal buffering is required in order to transmit an FC frame and to be prepared to receive that frame after it has traversed the entire arbitrated loop.

Referring back to FIG. 20, consider the data payload layout for the LIRP initialization frame 2016 and the LILP initialization frame 2018. During arbitrated loop initialization, an FC port can generate both the LI_ID 2002 and LI_FL 2003 fields because the LI_ID value is stored within the FC port as a state variable and the LI_FL flags represent inherent properties of a particular FC port, namely, whether that FC port supports the LIRP and LILP phases of loop initialization. The empty, or unused positions within the AL_PA position map, starting with position 2110 of FIG. 21 all contain the same value, 0xFF, and can thus be generated rather than stored and forwarded. Finally, the D_ID and S_ID fields (316 and 318 of FIG. 3, respectively), of the FC frame header (306 in FIG. 3) contained fixed values in loop initialization frames. If the FC port is an FL_Port or an F/NL_Port, the D_ID and S_ID fields contain the value 0x000000, and, for NL_Ports, the D_ID and S_ID fields contain the value 0x0000EF. The remaining fields of the FC frame header are fixed. Thus, the entire frame header can be generated on the fly based only on inherent characteristics of the FC port. Thus, very little of an FC arbitrated loop initialization frame needs to be stored during execution of the FC arbitrated initialization protocol. The majority of the FC arbitrated loop initialization frame can be generated on the fly for forwarding to the next node.

Figure 25:
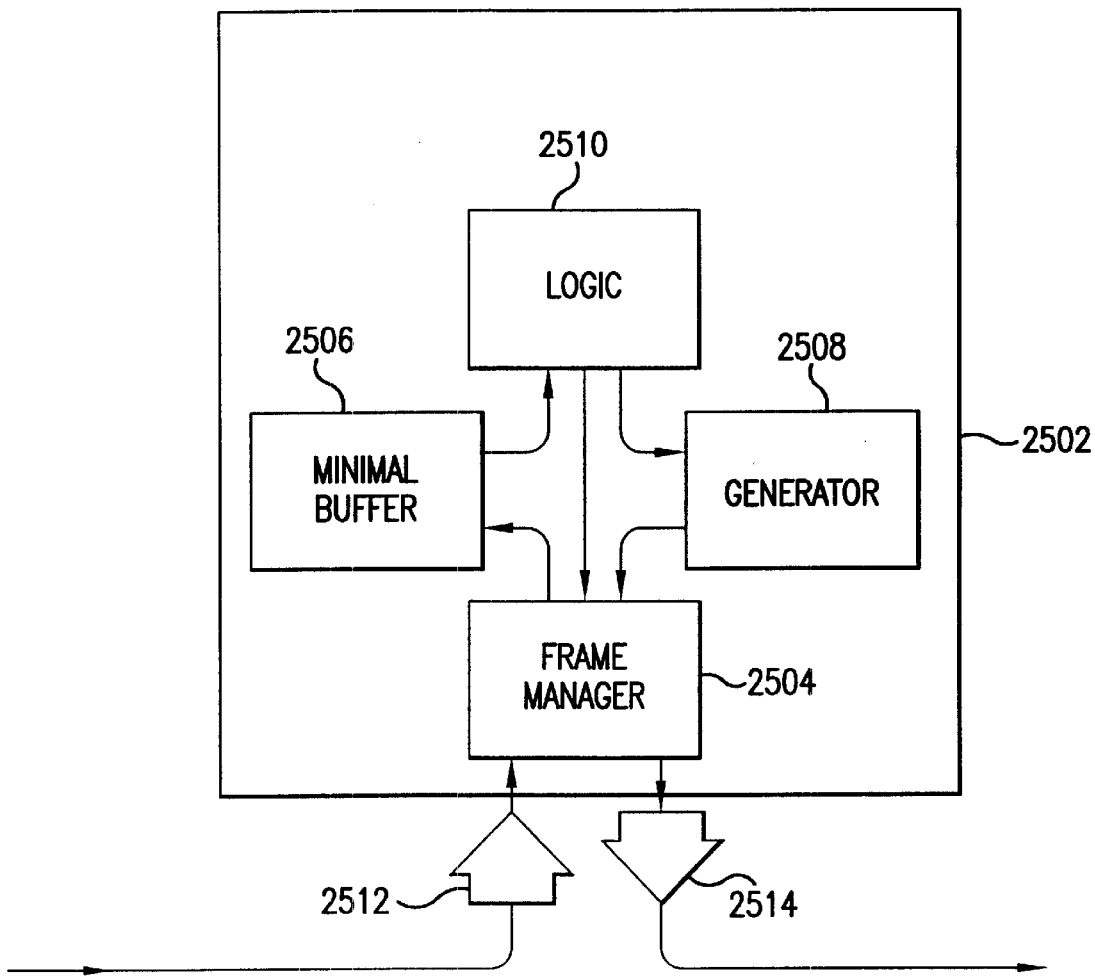
FIG. 25 is a block diagram of the principal components for the hardware implementation of the arbitrated loop initialization protocol within an FC interface controller.

FIG. 25 is a block diagram of the principal components of the hardware implementation of the arbitrated loop initialization protocol within an FC interface controller. The FC interface controller 2502 includes a frame manager 2504 (914 in FIG. 9), a minimal memory buffer 2506, a generator circuit 2508 for generating those portions of FC arbitrated loop initialization frames that can be generated on the fly rather than stored an forwarded, and logic circuitry 2510 for implementing the FC arbitrated loop initialization protocol. The interaction of these components will be described in the next subsection, in which a pseudo-code algorithm will be presented for illustrating implementation of the FC arbitrated loop initialization protocol.

The minimum buffer size required for the minimal buffer component 2506 can be calculated as follows. First, the total FC arbitrated loop initialization frame size that needs to be considered is the size of the frame header, 24 bytes, and the 132 bytes of the data payload for an LIRP or LILP FC arbitrated loop initialization frame. Thus, the total frame size that needs to be considered is 156 bytes. The inherent latency within the arbitrated loop equals:

$$\text{total latency} = N * \text{node latency} \quad (1)$$

where N is one less than the number of FC ports connected to the FC arbitrated loop. The inherent latency within the arbitrated loop plus the size of the minimal buffer 2506 within an FC port must be greater than or equal to the frame size that is being considered, or:

$$N * \text{node latency} + \text{buffer size} >= \text{frame size} \quad (2)$$

where the frame size, buffer size, and node latency have units of bytes. The units on both sites of the subsequent equations (3)–(7), below, are also bytes. Because an FC port needs to, at most, store the count byte (2102 in FIG. 21) and the AL_PAs of the FC ports within the FC arbitrated loop, the maximum buffer size required by an FC port for storing the non-generated portions of an FC arbitrated loop initialization frame is:

$$\text{buffer size} >= N+1 \quad (3)$$

The maximum buffer size is required in a case, such as that shown in FIG. 23, where little or no inherent buffering capacity is available within the arbitrated loop. Substituting for buffer size, in equation (2), the right-hand side of equation (3) produces:

$$N * \text{node latency} + N + 1 >= 156 \quad (4)$$

As discussed above, the node latency is conservatively estimated to be 12 bytes. Thus the above equation can be solved as follows $$N * 12 + N + 1 >= 156 \quad (5)$$

$$13N >= 155 \quad (6)$$

Then, N=12 is a threshold above which no buffering is required. When N is less than 12, then each FC port must be prepared to buffer an AL_PA position map containing 12 AL_PAs and a count field, or, substituting the result back into the equation (3), above:

$$\text{buffer size} >= 13 \quad (7)$$

Thus, the size of the minimum buffer component (2506 in FIG. 25) must be at least 13 bytes. In fact, because several phases of FC arbitrated loop initialization potentially require storing and forwarding 16-byte Al_PA bit maps, a practical minimum buffer size is 16-bytes.

Implementation of the Present Invention

In this subsection, a pseudo-code, C++—like implementation is provided to describe a preferred approach to a hardware implementation of the FC arbitrated loop initialization protocol. This pseudo-code implementation is provided for illustrative purposes only. A different development language, the Hardware Description Language ("HDL"), is employed by TL circuit designers to specify the function of the TL. This specification is then automatically translated into circuitry within the TL. Thus, a pseudo-code description of the hardware implementation is a reasonable and intuitive way in which to describe the hardware implementation. Obviously, there are many possible variations in the pseudo-code implementation to be presented in this subsection, and many additional details, including error conditions, that the present invention and the present invention's reliance on inherent buffering within the arbitrated loop and on generating significant portions of FC loop initialization frames.

The following five class declarations include support classes that will be used in the pseudo-code implementation of a state machine for carrying out the FC arbitrated loop initialization protocol.

```
1   class byte_array
2   {
3       byte_array (int num_bytes);
4       unsigned char & operator [] (int index);
5       Boolean           operator == (byte_array b);
6       Boolean           operator < (byte_array b);
7       void              setHighByte (unsigned char x);
8       void              setLowByte (unsigned char x);
9       void              setBit (int bit);
10      Boolean           bitSet (int bit);
11      Boolean           bitClear (int bit);
12  }
13
14  class queue
15  {
16      Boolean           more ();
17      Boolean           ARB_F0 ();
18      unsigned char     getNext ();
19      Boolean           CLS_Pr ();
20  }
21
22  class generator
23  {
24      void              transmit_header (Boolean fl_port);
25      void              transmit_FFs (int num);
26      void              transmit_LISM_frame (Boolean fl_port, byte_array x,
27                            byte_array & port_name);
28      void              transmit_LI_ID (LI_STATE s);
29      void              transmit_LI_FL (byte_array x);
30  }
31
```

```
-continued 32   class transmitter
33   {
34       void              transmit_byte (unsigned char b);
35       void              end_frame ();
36       void              transmit_ARB_F0 ();
37       void              transmit_CLS ();
38   }
39
40   class receiver
41   {
42       void              signal_receiver (Boolean participating);
43   }
```

The class "byte array," declared above on lines 1–12, implements fixed size byte arrays. Member functions declared for the class "byte_array" include: (1)"byte_array," a constructor that takes, as a single argument, that number of bytes that the fixed-size byte array will include; (2) an array indexing operator for accessing individual bytes within the byte_array just as elements of a language-defined array are accessed with the array indexing operator; (3) an equivalence conditional operator that compares one byte_array to another and returns the Boolean value TRUE if the two byte_arrays contain numerically equivalent values; (4) a "less than" conditional operator that compares the instant byte_array to a second byte_array and returns the Boolean value TRUE if the numerical value represented by the second byte_array is greater than that of the instant byte_array; (5) "setHighByte," a member function that sets the most significant byte of a byte_array to the value supplied in argument "x"; (6) "setLowByte," a member function that sets the least significant byte of a byte_array to the value supplied in argument "x"; (7) "setBit," a member function that sets the bit of the instant byte array specified by the argument "bit" to "1"; (8) "bitSet," a member function that returns the Boolean value TRUE is the bit of the instant byte array specified by the argument "bit" has the value "1"; and (9) "bitClear," a member function that sets the bit of the instant byte array specified by the argument "bit" to "0." The class "queue" declared above on lines 14–20, represents a generalized input queue from which the loop initialization state machine, to be described below, receives incoming bytes from the fibre channel. The class "queue" can be considered to be a generalization of the elastic store (934 in FIG. 9) and the minimal buffering component (2506 in FIG. 25). The elastic store (934 in FIG. 9) is a small buffer for buffering received bytes from the fibre channel that cannot be immediately forwarded by the transceiver (806 in FIG. 8) due to a lack of synchronization between the clocks of the receiver and transmitter components of the transceiver (806 in FIG. 8). The elastic store is a major source of inherent latency described in the previous subsection of each FC port. As also described in the previous subsection, minimal additional buffering is required to receive a frame from the FC port while transmission of an FC arbitrated loop initialization frame by a given FC port is carried out. Thus, the class "queue" represents a buffer, or byte sink, that comprises both the elastic store (934 in FIG. 9) and the minimal memory buffer component (2306 in FIG. 25). Four methods are declared for the class "queue:" (1) "more," a method that returns a Boolean value indicating whether there are additional bytes in the queue available for processing; (2) "ARB_F0," a method that returns a Boolean value indicating whether an ARB_OF FC primitive has been received by the receiver and placed, in order of reception, into the queue; (3) "get next," a method that returns the next available byte within the queue; and (4) "CLS_Pr," a method that returns a Boolean value indicating whether a CLS FC primitive has been received by the receiver and placed, in order of reception, into the queue. A primitive, such as the ARB_F0 and CLS primitives, is a set of four bytes that do not belong to an FC frame and that include a type indication for distinguishing different types of primitives.

It should be noted that, in the case of these classes, and in the case of most of the classes to be described below, implementations of the declared methods will not be provided. The methods either represent well-known and easily implemented functionality, as in the case of the queue methods, described above, or represent low-level hardware components that are implemented in state machines or electronic circuitry. In both cases, implementation of such methods is well-known in the electronics and microprocessor design fields.

The next three classes to be described represent the receiver component, transmitter component, and generator component (2512, 2514, and 2508, respectively, in FIG. 25) of an FC port (2502 in FIG. 25). The class "generator," declared above on lines 22–30, includes the following five methods: (1) "transmit_header," a method taking a Boolean value "fl_port" as the single argument to indicate whether the FC port is, or is not, an FL_Port, and causes the generator to generate and transmit an FC arbitrated loop initialization frame header to the FC; (2) "transmit_FFs," a method that generates and transmits to the FC a number of bytes, specified by the single argument "num," having values of 0xFF; (3) "transmit_LISM_frame," a method that generates and transmits to the FC an LISM FC arbitrated loop initialization frame, using the values of the arguments "fl_port," "x," and "port_name" to generate the LI_ID field, the LI_FL field, and the data field of the LISM FC arbitrated loop initialization frame; (4) "transmit_LI_ID," a method that generates and transmits the LI_ID field of an FC arbitrated loop initialization frame according to an argument "s" that specifies the current FC arbitrated loop initialization phase of the FC port; and (5) "tramsmit_LI_FL," a method that generates and transmits to the FC an LI_FL FC arbitrated loop initialization frame LI_FL field according to flags specified in the argument "x."

The class "transmitter," declared above on lines 32–38, includes the methods: (1) "transmit_byte," a method that transmits a single byte "b" to the FC; (2) "end frame," a method that indicates to the transmitter that the FC arbitrated loop initialization frame currently being transmitted is complete, and that the transmitter should transmit the CRC and EOF fields (310 and 312 in FIG. 3) to complete transmission of the frame; (3) "transmit_ARB_F0," a method that transmits an ARB_F0 primitive to the FC; and (4) "transmit_CLS," a method that transmits a CLS primitive to the FC. Finally, the class "receiver," declared above on lines 40–43, includes the single method "signal receiver" that indicates to the receiver component that the FC port has completed the fibre channel arbitrated loop initialization protocol and indicates to the receiver by the argument "participating" whether or not the FC port has acquired an AL_PA during the initialization process and will be participating in the FC arbitrated loop.

The following two enumerations represent FC arbitrated loop initialization phases and FC states, and the following constant and global variable represent constant values used in the pseudo-code implementation below:

1 enum LI_STATE =2 {LISM, ARBFO, LIFA, LIPA, LIHA, LISA, LIRP, LILP}; 3 enum FC_STATE ={NO_FRAME, FRAME_HEADER, DATA_FIELD}; 4 5 const int LOOP_MAP_ENABLE =8; .6 7 byte-array zero(2); The enumeration "LI_STATE," declared above on lines 1 and 2, represents the various different FC arbitrated loop initialization phases along with an additional phase, "ARBF0," used in the implementation of the loop initialization protocol to be described below. The enumeration "FC_STATE," declared above on line 3, represents three phases of FC arbitrated loop initialization frame reception, used below in the implementation of the FC arbitrated loop initialization protocol. The constant integer "LOOP_MAP_ENABLE," declared above on line 5, represents the bit of the LI_FL field within a loop initialization frame that indicates whether the final two phases of loop initialization are supported by a particular FC port. The 2-byte byte_array global variable "zero," declared above on line 7, is a byte_array with the value "0x00" stored in both bytes and is used in transmitting loop initialization frames.

The class "li_state_machine," declared below on lines 1–66, represents the state machine and circuitry implementation of the FC arbitrated loop initialization protocol within the interface controller of an FC port.

```
1   class li_state_machine
2   {
3       // intrinsic characteristics of port
4       byte_array        port_name(8);
5       Boolean           fl_port;
6       byte_array        S_ID(3);
7       byte_array        D_ID(3);
8       byte_array        LI_FL(2);
9
10      // acquired characteristics of port
11      unsigned char     fa_al_pa;
12      unsigned char     pa_al_pa;
13      unsigned char     ha_al_pa;
14      Boolean           fa_al_pa_assigned;
15      Boolean           pa_al_pa_assigned;
16      Boolean           ha_al_pa_assigned;
17
18      //port components
19      generator         gen;
20      transmitter       trans;
21      receiver          recv;
22      queue             q;
23      byte_array        host_position_map(128);
24
25      // port state variables
26      Boolean           lim = FALSE;
27      LI_STATE          li_state = LISM;
28      FC_STATE          fc_state = NO_FRAME;
29      Boolean           participate = FALSE;
30      Boolean           al_pa_found = FALSE;
31      unsigned char     al_pa;
32      Boolean           LIRP_LILP_enabled = TRUE;
33      byte_array        li_id_buff(2);
34      byte_array        li_fl_buff(2);
35      Boolean           closeWindow = FALSE;
36
37      //variables that span multiple function invocations
38      byte_array        s_id(3);
39      byte_array        d_id(3);
40      byte_array        pname(8);
41      int               byte_count;
42      int               index;
43      Boolean           blasted_FFs;
44
45      //port member functions
46      li_state_machine ();
47      void              reset();
48      void              producer_signal ();
49      void              error ();
50      void              set_timer ((void *) ());
51      void              clear_timer ((void *) ());
52      void              next_frame ();
53      li_state          extract_phase (byte_array b);
54      Boolean           check_phase_sequence (li_state l);
55      void              lism_datum (unsigned char t);
```

-continued

```
56      void            lifa_datum (unsigned char t);
57      void            lipa_datum (unsigned char t);
58      void            liha_datum (unsigned char t);
59      void            lisa_datum (unsigned char t);
60      void            lirp_datum unsigned char t);
61      void            lilp_datum (unsigned char t);
62      int             getBitMapByte (unsigned char alpa);
63      Boolean         setBitMapByte (unsigned char & t, unsigned char alpa);
64      Boolean         clearBit (unsigned char t);
65      unsigned char   getAL_PA (unsigned char & t, int cnt);
66   }
```

Five data members, declared above on lines 4–8, represent intrinsic characteristics or parameters of an FC port. The data member "port_name," declared above on line 4, is the FC address given to the FC port at the time of manufacture and guaranteed to be unique with respect to all other FC ports. The data member "fl_port," declared above on line 5, is a Boolean value indicating whether or not the FC port is an FL_Port. The date member "S_ID," declared above on line 6, is the 3-byte S_ID field for the FC port. The data member "D_ID," declared above on line 7, is the 3-byte D_ID used in FC arbitrated loop initialization frame headers for the FC port. These two frame header values, S_ID and D_ID, contain one value if the FC port is an FL_Port, and contain a different value if the FC port is an NL_Port. Finally, the data member "LI_FL," declared above on line 8, represents the loop initialization flags that characterize the FC port and that are included in the LI_FL field of FC arbitrated loop initialization frames transmitted by the FC port.

The next set of data members, declared above on lines 11–16, represent various characteristics of the FC port that are acquired by, and remembered by, the FC port during operation of the FC port. The data member "fa_al_pa," declared above on line 11, represents an AL_PA assigned to the FC port by the FC fabric. The data member "pa_al_pa," declared above on line 12, represents an AL_PA previously acquired by the FC port prior to the start of loop initialization. The data member "ha_al_pa," declared above on line 13, represents an AL_PA assigned to the FC port by some hardware-controlled method or procedure. The data members "fa_al_pa_assigned," "pa_al_pa_assigned," and "ha_al_pa_assigned," declared above on lines 14–16, indicate whether the respective data members declared on lines 11–13, above, contain a valid AL_PA.

The next five data members, declared on lines 19–23, represent components of the FC port. The first four components, declared on lines 19–22, represent the generator, transmitter, receiver, and generalized queue, as described above. The final data member, "host_position_map," declared above on line 23, represents an AL_PA position map stored in host memory and accessible by the TL.

The next set of data members, declared above on lines 26–35, represents a number of state variables used in the hardware implementation of the FC arbitrated loop initialization protocol. These state variables include: (1) "lim," a Boolean value indicating whether the FC port is a loop initialization master; (2) "li_state," a data member of type LI_STATE that represents the current FC arbitrated loop initialization phase of the FC port; (3) "fc_state," a data member representing the current receiver state, as discussed above; (4) "participate," a Boolean variable indicating whether or not the FC port will participate in the arbitrated loop following completion of the FC arbitrated loop initialization protocol; (5) "al_pa_found," a Boolean variable indicating whether the FC port has acquired an AL_PA during FC arbitrated loop initialization; (6) "al_pa," a data member that contains any AL_PA acquired by the FC port during FC arbitrated loop initialization; (7) "LIRP_LILP_enabled," a data member that indicates whether the final two phases of loop initialization will be carried out; (8) "li_id_buff," a data member that buffers an incoming LI_ID loop initialization frame field; (9) "li_fl_buff," a data member that buffers an incoming LI_FL loop initialization frame field; and (10) "closeWindow," a Boolean variable that indicates whether the loop initialization state machine can receive a terminating CLS primitive to terminate the loop initialization process.

The next set of data members, declared above on lines 38–43, contain values that must be maintained over the span of multiple member function invocations. These data members include: (1) "s_id," a 3-byte byte_array that contains the S_ID field acquired from an FC arbitrated loop initialization frame header; (2) "d_id," a similar 3-byte byte array that contains a D_ID obtained from a frame header; (3) "pname," an 8-byte byte_array that contains a port name acquired from the data field of an FC arbitrated loop initialization frame; (4) "byte_count," a data member that contains the count, or offset, of a byte received from the FC with respect to the start of either the FC frame header or FC data payload section of the FC frame; (5) "index," a data member used to store the index of the position in an AL_PA position map into which the FC port will insert the FC port's AL_PA; and (6) blasted_FFs, a data member that indicates that the remaining empty slots of an AL_PA position map have been generated by the generator component.

Finally, the declaration of class "li_state_machine" includes 20 member functions, declared above on lines 46–65. The member function "li_state_machine" is a constructor for the class "li state_machine," declared above on line 46, in which the data members that described inherent and acquired characteristics of an FC port are initialized. The member function "reset," declared above on line 47, is called during the power up sequence for an FC port, or in response to detected error conditions during FC arbitrated loop initialization or FC arbitrated loop operation. The member function "producer_signal," declared on line 48, implements the bulk of the FC arbitrated loop initialization protocol. This function is invoked either by a call by the receiver component of the FC port, or via a signaling mechanism initiated by the receiver component, upon receipt and placement into the queue "q" by the receiver component of one or more bytes from the FC. The member function "error," declared above on line 49, represents a generalized error routine for handling error conditions that arise during the FC arbitrated loop initialization protocol. The member function "set_timer," declared above on line 50, sets an internal timer that, when expired, results in a call to the function pointed to by the function pointer supplied as a single argument. The member function "clear_timer," declared on line 51, disables a timer associated with the function pointed to by the function pointer supplied as a single argument that was previously enabled by a call to the member function "set_timer." The member function "next_frame," declared on line 52, is repeatedly called in response to expiration of a timer in order to cause an LISM FC arbitrated loop initialization frame to be transmitted by the FC port. The member function "extract_phase," declared above on line 53, extracts an LI_STATE value from the byte, supplied as argument "t," corresponding to the LI_ID field of an FC arbitrated loop initialization frame. The member function "check_phase_sequence," declared above on line 54, determines whether the loop initialization phase of an incoming FC arbitrated loop initialization frame corresponds to the current loop initialization phase of the FC port. If not, the member function "check_phase_sequence" returns the Boolean value FALSE indicating that an error in loop initialization has occurred.

The next seven member functions, declared on lines 55–61, are called to process received bytes corresponding to the data fields of FC arbitrated loop initialization frames. All seven functions take a data-field byte as a single argument "t" and process that byte according to the FC arbitrated loop initialization protocol. The member function "getBitMapByte," declared above on line 62, returns the index of a byte within a 16-byte bitmap that corresponds to an AL_PA supplied as the argument "alpa." The member function "setBitMapByte," declared above on line 63, sets the bit in the byte of a bitmap, supplied as the passed-by-reference argument "t," that corresponds to the AL_PA supplied as argument "alpa," if the bit is not already set. If the bit is already set, SetBitMapByte returns FALSE, while if SetBitMapByte sets the bit, SetBitMapByte returns TRUE. The member function "clearBit," declared above on line 64, returns a Boolean value indicating whether or not there is an unset bit in the bitmap byte supplied as argument "t." Finally, the member function "getAL_PA," declared above on line 65, takes a byte from a bitmap and an integer indicating the position of the byte within the bitmap, supplied as arguments "t" and "cnt," and returns an AL_PA corresponding to the first unset bit within the byte and, at the same time, sets the bit within the byte specified by argument "t."

An implementation for the li_state_machine member function "reset" is provided below:

```
1    void li_state_machine::reset ()
2    {
3        lim = FALSE;
4        li_state = LISM;
5        fc_state = NO_FRAME;
6        participate = FALSE;
7        al_pa_found = FALSE;
8        gen.transmit_LISM_frame (fl_port, LI_FL, port_name);
9        set_timer (&next_frame);
10   }
```

1 void li_state_machine::reset 0 3 lim =FALSE; 4 li state =LISM; 5 fc state=NO_FRAME; 6 participate =FALSE; 7 al_pa found =FALSE; 8gen.transmit_LISM frame (fl_port, LL_FL, port-name); 9 set_timer (&next frame); 10} This member function, called during the power up sequence for the FC port, or in response to detected error conditions during FC arbitrated loop initialization or FC arbitrated loop operation, resets the values of various state variables of the li_state_machine on lines 3–7, transmits a first LISM FC arbitrated initialization frame on line 8, and sets a timer to call the li_state_machine member function "next_frame" when the timer expires.

An implementation of the li_state_machine member function "next_frame" is provided below:

```
1    void li_state_machine::next_frame ()
2    {
3        clear_timer (&next_frame);
4        if (li_state == LISM)
5        {
6            gen.transmit_LISM_frame (fl_port, LI_FL, port_name);
7            set_timer (&next_frame);
8        }
9    }
```

1 void li_state_machine::next_frame 0 2 { 3 clear_timer (&next frame); 4 if (listate ==LISM) 5{ 6 gen.transmit_LISM_frame (fl_port, LL_FL, port_name); 7 set-timer (&next_frame); 8 ) 9}
The li_state_machine member function "next_frame" disables the timer on line 3, set either on line 9 of the member function "reset" or on line 7 of next frame, and then, if the FC port is in the LISM loop initialization phase, as detected on line 4, generates and transmits another LISM FC arbitrated loop initialization frame on line 6 and reinitializes the timer on line 7. Thus, the member function "next_frame" is continuously executed by the li_state_machine until the FC port transitions from the LISM loop initialization phase to another of the FC loop initialization phases.

An implementation of the li_state_machine member function "producer_signal" is provided below:

```
1    void li_state_machine::producer_signal ();
2    {
3        unsigned char t;
4        Boolean arbf0;
5        int dex;
6        LI_STATE msg_phase;
7
8        while (q.more ())
9        {
10           if (q.ARB_F0 ())
11           {
12               t = q.getNext ();
```

-continued

```
13      if (fc_state == NO_FRAME &&
14       li_state == ARBF0)
15      {
16              if (!lim)
17              {
18                  trans.transmit_ARB_F0 ();
19                  clear_timer (&error);
20                  set_timer (&error);
21                  continue;
22              }
23              else li_state = LIFA;
24          }
25          else error ();
26      }
27      if (q.CLS_Pr ())
28      {
29          clear_timer (&error);
30          if (closeWindow)
31          {
32              recv.signal_receiver (participating);
33              return;
34          }
35          else error ();
36      }
37      t = q.get_next ();
38      switch (fc_state)
39      {
40          case NO_FRAME:
41              byte_count = 1;
42              fc_state = FRAME_HEADER;
43              if ((li_state > LISM) &&
44                  ((lim && li_state < LILP)||(!lim)))
45                      gen.transmit_header (fl_port);
46              break;
47          case FRAME_HEADER:
48              if (byte_count >= 1 && byte_count <= 3)
49              {
50                  dex = byte_count - 1;
51                  d_id[dex] = t;
52                  byte_count++;
53              }
54              else if (byte_count >= 5 && byte_count <= 7)
55              {
56                  dex = byte_count - 5;
57                  s_id[dex] = t;
58                  byte_count++;
59              }
60              else if (byte_count == 22)
61              {
62                  fc_state = DATA_FIELD;
63                  byte_count = 0;
64              }
65              else byte_count++;
66              break;
67          case DATA_FIELD:
68              if (byte_count == 0)
69              {
70                  li_id_buff.setHighByte(t);
71                  byte_count++;
72              }
73              else if (byte_count == 1)
74              {
75                  li_id.setLowByte(t);
76                  msg_phase = extract_phase (li_Id_buff);
77                  if (!check_phase_sequence (msg_phase)) error ();
78                  byte_count++;
79                  clear_timer (&error);
80                  if (li_state > LISM)
81                  {
82                      if (lim && li_state < LILP)
83                      {
84                          gen.transmit_LI_ID (++li_state);
85                          li_state--;
86                          set_timer (&error);
87                      }
88                      else if (!lim)
89                      {
90                          li_state++;
91                          gen.transmit_LI_ID (li_state);
```

-continued

```
92                set_timer (&error)
93                if(li_state>=LIRP)
94                {
95                    blasted FFs = FALSE;
96                    closeWindow = FALSE;
97                }
98              }
99            }
100         }
101         else if (byte_count == 2)
102         {
103             li_fl_buff.setHighByte(t);
104             byte_count++;
105         }
106         else if (byte_count == 3)
107         {
108             //optional LIRP enable flag processing
109             li_fl_buff.setLowByte(t);
110             if (lim)
111             {
112                 if (li_state == LISA)
113                 {
114                     if (!li_fl_buff.bitSet (LOOP_MAP_ENABLE))
115                         LIRP_LILP_enabled = FALSE;
116                 }
117                 if (li_state == LIHA) gen.transmit_LI_LF (LI_FL);
118                 else if (li_state < LILP)
119                     gen.transmit_LI_LF (zero);
120             }
121             else
122             {
123                 if (li_state == LISA)
124                 {
125                     if (!li_fl_buff.bitSet (LOOP_MAP_ENABLE))
126                         gen.transmit_LI_LF (li_fl_buff);
127                     else gen.transmit_LI_LF (LI_LF);
128                 }
129                 else gen.transmit_LI_LF (zero);
130             }
131             byte_count++;
132         }
133         else
134         {
135             switch (li_state)
136             {
137                 case LISM:
138                     lism_datum (t);
139                     break;
140                 case LIFA:
141                     lifa_datum (t);
142                     break;
143                 case LIPA:
144                     lipa_datum (t);
145                     break;
146                 case LIHA:
147                     liha_datum (t);
148                     break;
149                 case LISA:
150                     lisa_datum (t);
151                     break;
152                 case LIRP:
153                     lirp_datum (t);
154                     break;
155                 case LILP:
156                     lilp_datum (t);
157                     break;
158             }
159         }
160         break;
161     }
162   }
163 }
```

1 void li_state_machine::producer-signal 0; 2 { 3 unsigned char t; 4 Boolean arbfo; 5 int dex; 6 LI_STATE msg_phase; 7 8 while (q.more 0) 9{ 10 if (q.ARB_FO 0) 11{ 12 t =q.getNext 0; 13 if (fc[]state ==NO_FRAME && 14 li_state ==ARBFO) 15{ 16 if (!Iim) 17{ 18 trans.transmit_ARB_FO 0; 19 clear_timer (&error); 20 set_timer (&error); 21 continue; 22}23 else li_state =LIFA; 24}25 else error 0; 26}27 if (q.CLS_Pr 0) E28{29 clear_timer

```
(&error); 30 if (closeWindow) 31{32 recv.signal receiver
(participating); 33 return; 34}35 else error 0; 36}37 t
=q.get_next 0; 38 switch (fc-state) 39{ 40 case
NO_FRAME: 41 byte_count =1; 42 fc_state =FRAME_
HEADER; 43 if ((Ii_state >LISM) && 44 ((lim &&
li_state <LILP)ll(!lim))) 45 gen.transmit_header (fl_port);
46 break; 47 case FRAME_HEADER: 48 if (byte_count
>=1 && byte[]count <=3) 49{ 50 dex =byte_count- 1;
54 EXPRESS 1 NO. EL074352000US 51 djid(dex] =t; 52
byte-count++; 53}54 else if (byte_count >=5 && byte-
count <=7) 55{ 56 dex =byte_count - 5; 57 s id[dex] =t; 58
byte[]count++; 59}60 else if (byte-count ==22) 61{ 62
fc_state =DATA_FIELD; 63 byte-count =0; 64}65 else
byte count++; 66 break; 67 case DATA_FIELD: 68 if
(byte-count ==0) 69{ 70 li_id_buff.setHighByte(t); 71 byte
count++; 72}73 else if (byte_count ==1) 74{ 75
li_id.setLowByte(t); 76 msg_phase =extract phase (li
ld_buff); 77 if (!check phase sequence (msg_phase)) error
0; 78 byte count++; 79 clear_timer (&error); 80 if (listate
>LISM) 81{82 if (lim && li_state <LILP) 83{84
gen.transmit_L_ID (++li state); 85 li_state--; 86 set-timer
(&error); 87}88 else if (!lim) 89{90 li_state++; 91
gen.transmit_Ll_ID (li_state); 92 setjtimer (&error) 93
if(listate>=LIRP) 94{95 blasted FFs =FALSE; 96 closeWin-
dow =FALSE; 97}98}99}100}
    0 55 EXPRESS 1 NO. EL074352000US 101 else if
(byte_count ==2) 102 { 103 li_fl_buff.setHighByte(t); 104
byte-count++; 105}106 else if (byte-count ==3) 107 { 108
//optional LIRP enable flag processing 109 li_fl_
buff.setLowByte(t); 110 if (lm) []111 { 112 if (li-state
==LISA) 113 { 114 if (!li_fl_buff.bitSet (LOOP_MAP_
ENABLE)) 115 LIRP_LILP enabled=FALSE; 116}117 if
(listate ==LIHA) gen.transmit_Ll_LF (Ll_FL); 118 else if
(listate <LILP) 119 gen.transmit_LI_LF (zero); 120}121
else 122 { 123 if (li_state ==LISA) 124 { 125 if (!li_fl_
buff.bitSet (LOOP-MAP_ENABLE)) 126 gen.transmit_
LI_LF (lifl buffl); 127 else gen.transmit Ll LF (LI LF);
128}129 else gen.transmit_Ll_LF (zero); 130}131 byte
count++; 132 ) 133 else 134 { 135 switch (li_state) 136 {
137 case LISM: 138 lism_datum (t); 139 break; 140 case
LIFA: 141 lifa_datum (t); 142 break; 143 case LIPA: 144
lipa datum (t); 145 break; 146 case LIHA: 147 liha_datum
(t); 148 break; 149 case LISA: 150 lisa_datum (t);
    56 EXPRESS I@ NO. EL074352000US 151 break; 152
case LIRP: 153 lirp_datum (t); 154 break; 155 case LILP:
156 lilp_datum (t); 157 break; 158}159}160 break;
161}162}163}
```

The li_state_machine member function "producer signal" implements the bulk of the FC arbitrated loop initialization protocol. It is invoked either via a direct call, or via a signal, by the receiver component of the FC port when the receiver component receives that next byte from the FC. Because of timing considerations, when producer_signal begins executing, there may be more than one byte residing in the queue "q" or the queue "q" may be empty. Thus, producer signal is implemented as a large while-loop encompassing lines 8–162, above, which repeatedly tests the queue "q" to see whether the queue "q" contains a byte for processing and, if so, then proceeds to process that byte.

If the byte in the queue "q" indicates that the receiver has received an ARB_F0 primitive, as detected by producer_signal on line 10, producer_signal calls the getNext function of the queue "q" on line 12 to remove the ARB_F0 primitive. If the FC port is in the ARBF0 loop initialization state and the fibre channel state is NO_FRAME, as detected on line 13–14, then the ARB_F0 primitive is handled by producer_signal on lines 16–23. Otherwise, this ARBF0 primitive was sent in error, and producer_signal calls the error member function on line 25. If the FC port is not the LIM, as detected on line 16, then the FC port forwards the ARB_F0 primitive on line 18, disables and resets the timer on lines 19 and 20, and continues a subsequent iteration of the encompassing while-loop on line 8 via a continue statement on line 21. If the FC port is the LIM, then producer_signal sets the loop initialization phase for the FC port to LIFA on line 23, since receipt of the ARB_F0 primitive means that the ARB_P0 primitive has traveled all the way around the FC arbitrated loop.

If the byte in the queue "q" indicates that the receiver has received a CLS primitive, as detected by producer_signal on line 27, producer_signal clears the timer on line 29, and determines, on line 30, if the variable "closeWindow" contains the value TRUE. If so, then loop initialization has finished, and producer_signal calls the receiver member function "signal_receiver," on line 32, to indicate to the receiver whether or not the FC port executing producer signal will participate in the FC arbitrated loop. The member function "producer_signal" then returns, on line 33. If, on the other hand, the variable "closeWindow" contains the Boolean variable FALSE, then the receipt by the FC port of a CLS primitive represents an error, and producer_signal calls the member_function "error" on line 35.

On lines 37–161, producer_signal processes bytes corresponding to bytes within received FC arbitrated loop initialization frames. First, on line 37, producer_signal fetches the next byte from the queue "q" and places it in the variable "t." The byte "t" is then processed by the switch statement encompassing lines 38–160. There are three main FC states in which the F_Port can reside: (1) NO_FRAME, in which state the byte to be processed is processed by the code on lines 41–46 beneath the case statement on line 30; (2) FRAME_HEADER, in which state the byte to be processed is processed by producer_signal on lines 48–66 below the case statement on line 47; and (3) DATA FIELD, in which state the byte to be processed is processed by producer_signal on lines 68–160 below the case statement on line 67.

If the current FC_STATE is NO_FRAME, then producer_signal sets the variable "byte_count" to 1 on line 41 and increments the fc_state to FRAME_HEADER on line 42. If the FC port is in a loop initialization phase greater then the loop initialization phase "LIM," and if either the FC port is the LIM and in a loop initialization phase less than, or below, the LILP phase, or the FC port is not the LIM, as detected by producer_signal on lines 43–44, then producer_signal initiates generation and transmission of an FC arbitrated loop initialization frame header on line 45. If the FC port is the LIM, this frame header will correspond to the FC arbitrated loop initialization frame for the next loop initialization phase, while, on the other hand, if the FC port is not the LIM, then this frame header will correspond to the forwarding of the FC arbitrated loop initialization frame currently being processed by the FC port. Note that variable "byte_count" indexes the bytes of a frame header or FC arbitrated loop initialization frame data payload starting with an index of 0, and points to the byte currently being processed by producer_signal.

During processing of the frame header bytes on lines 48–66, producer_signal A detects and saves bytes corresponding to the D_ID and S_ID fields of the frame header into the variables d_id and s_id, respectively, on lines 51 and 57. When the entire frame header has been processed, as detected by producer_signal on line 60, then producer_signal sets the FC_STATE to DATA_FIELD and resets the byte count on lines 62 and 63. Otherwise, on line 65, producer_signal increments byte_count in order to prepare to process the next byte of the frame header that will be received either in a subsequent iteration of the while-loop on line 8 or a subsequent invocation of the member function "producer_signal."

Finally, on lines 68–160, producer_signal processes bytes of an FC arbitrated loop initialization frame data payload. The first two bytes of the data payload represent the LI_ID field, processed by producer_signal on lines 68–100. The second two bytes of the data payload is the LI_FL field, processed by producer_signal on lines 101–132. The first and subsequent bytes of the FC arbitrated loop initialization frame data field are processed on lines 135–158. The first byte, and most significant byte, assuming an FC big endian byte delivery, is processed by producer_signal by placing the byte into the buffer "li_id_buff" on line 70. If the current byte being processed is the second, least significant byte of the LI_ID field, then producer_signal extracts the loop initialization phase from the LI_ID field on line 76 and checks, on line 77, to make sure that phase is consistent with the current loop initialization state of the FC port. If the extracted loop initialization phase is not consistent, producer_signal calls the routine "error" on line 77. Otherwise, producer_signal increments the byte_count variable on line 78, and disables the timer on line 79. If the loop initialization state of the FC port is greater than the loop initialization state LISM, then the incoming FC arbitrated loop initialization frame must either be forwarded, in the case that the FC port is not the LIM, or a new FC arbitrated loop initialization frame must be transmitted, in the case that the FC port is the LIM. In the case that the FC port is the LIM and the loop initialization state is less than LILP and greater than LISM, producer_signal generates and transmits the LI_ID field corresponding to the next FC port state on line 84 and sets the timer on line 86, thereby beginning transmission of the data field of the next FC arbitrated loop initialization frame. If the FC port is not the LIM, then producer signal increments the loop initialization state, on line 90, and forwards the LI_ID field by generation, sets the timer, and resets the blasted_FFs and closeWindow variables on lines 91–97.

If the first byte of the LI_FL field of an FC arbitrated loop initialization frame is being processed, as detected by producer signal on line 101, then that byte is stored in the buffer "li_fl_buff" on line 103 by producer_signal. If the second byte of the LI_FL field of an FC arbitrated loop initialization frame is being processed, as detected by producer_signal on line 106, then if the FC port is the LIM, as detected by producer_signal on line 110, then producer_signal processes the received LI_FL field on lines 112–119. If the li_state is LISA, then the LI_FL field indicates whether the final two phases of FC arbitrated loop initialization, LIRP and LILP, will be carried out. If the loop enable bit is not set, as detected by producer_signal on line 114, then the variable "LIRP_LILP_enabled" is set to FALSE, on line 115, to indicate lack of support of the loop phases LIRP and LILP by some node on the loop. If the li_state is LIHA, then producer_signal transmits the LIM FC port's LI_FL as the LI_FL field for the LISA frame. Otherwise, if a frame is to be forwarded by the LIM FC port, then a LI_LF field having the value "0" in both bytes is transmitted, on line 119. If the FC port is not the LIM, as detected by producer_signal on line 120, then the received LI_LF frame is forwarded, on line 126, if the loop map enable bit is not set in the received LI_FL field and the li_state is LISA. Otherwise, if the li_state is LISA, producer_signal forwards the LI_FL of the non LIM FC port, on line 127. If the li_state is not LISA, then producer_signal forwards a LI_LF field having the value "0" in both bytes, on line 128. Again, on line 131, byte count is incremented. If the byte currently being processed is a data field byte, then a data field byte processing routine appropriate to the current loop initialization state is called by producer_signal via the switch statement encompassing lines 135–161.

The li_state_machine member function "lism_datum" is provided below:

```
1   void li_state_machine::lism_datum (unsigned char t)
2   {
3       int dex;
4
5       dex = byte_count - 2;
6       pname[dex] = t;
7       if (if (dex == 7)
8       {
9           fc_state = NO_FRAME;
10          if (s_id < S_ID || d_id < D_ID || pname < port_name))
11          {
12              li_state = ARBF0;
13              set_timer (&error);
14          }
15          if (pname == port_name && s_id == S_ID && d_id == D_ID)
16          {
17              lim = TRUE;
18              set_timer (&error);
19              trans.transmit_ARB_F0 ();
20              gen.transmit_header (fl_port);
21              gen.transmit_LI_ID (LIFA);
22              gen.transmit_LI_FL (zero);
23              for (int j = 0; j < 16; j++)
24              {
25                  if (fa_al_pa_assigned && getBitMapByte (fa_al_pa) == j)
26                  {
27                      al_pa_found = TRUE;
28                      al_pa = fa_al_pa;
29                      trans.tranmit_byte (setBitMapByte (fa_al_pa));
```

```
30                 }
31                 else trans.tranmit_byte (0x00);
32             }
33             li_state = ARB_F0;
34         }
35     }
36     else byte_count++;
37 }
```

1 void li_state_machine::Iism_datum (unsigned char t) 2{ 3 int dex; 4 5 dex =byte count - 2; 6 pname[dex] =t; 7 if (if (dex ==7) 8 { 9 fc_state =NO_FRAME; 10 if (s_id <S_ID 11 d_id <D-ID pname <port_name)) 11 { 12 li_state =ARBFO; 13 set_timer (&error); 14}15 if (pname ==port-name && sid ==SID && did ==DID) 16 { 17 lim =TRUE; 18 set_timer (&error); 19 trans.transmit_ARB-F0 0; 20 gen.transmit_header (fl_port); 21 gen.transmit_LI_ID (LIFA); 22 gen.transmit_Li_FL (zero); 23 for (intj =0; j <16; j++) -24 25 if (fa_al_pa_assigned && getBitMap-Byte (fa_al_pa) ==j) 26 { 27 al_pa found =TRUE; 28 al_pa fa al_pa; 29 trans.tranmit byte (setBitMapByte (faal_pa)); 30}31 else trans.tranmit-byte (OxOO); 32}33 li_state =ARB_FO; 34}35}36 else byte_count++; 37}
First, lism_datum computes the index of the current byte being processed with respect to the beginning of the data field, and places that index into the local variable "dex," on line 5. Since the data field of an LISM FC arbitrated loop initialization frame is simply an 8-byte port_name, lism_datum places the byte being processed into the appropriate slot of the variable "name p" that contains the port_name being received on line 6. If the current byte is the final byte of the LISM FC arbitrated loop initialization frame data field, as detected on line 7, then producer_signal sets the fc_state to NO_FRAME, on line 9. If the received S_ID, stored in the variable "s_id," is less than the FC port's S_ID, or if the received D_ID, stored in the variable "d_id," is less than the FC port's D_ID, or the port_name characteristic to the FC port is lower than the received port name, as detected by producer_signal on line 10, then the FC port has recognized that an FC port with a lower port name exists on the FC arbitrated loop and thus the FC port cannot become the LIM. In this case, lism_datum sets the loop initialization state of the FC port to ARBF0 on line 12 and sets the timer on line 13 in order to wait for reception of an ARB_F0 primitive from the FC port that will eventually become the LIM. If, on the other hand, the FC port recognizes the received LISM FC arbitrated loop initialization frame as the frame that it originally transmitted to the FC, then this FC port will become the LIM, as detected by lism_datum on line 15, where the values in the variables "s_id," "d_id," and "pname" correspond to the FC port's characteristic values S_ID, D_ID, and port_name. In this case, the FC port sets the state variable "lim" to TRUE on line 17, sets a timer on line 18, transmits an ARB_F0 primitive on line 19, generates and transmits a header for the subsequent LIFA FC arbitrated loop initialization frame on line 20, generates and transmits the LI_ID and LI_FL fields for the LIFA FC arbitrated loop initialization frame on lines 21 and 22, and then transmits the 16 bytes of the bitmap of the LIFA frame on lines 23–32. If the FC port has been assigned an AL_PA by the fabric, then, on lines 25–30, the corresponding bit of the appropriate byte of the bitmap is set when that byte is being transmitted on line 29. All other bytes of the bitmap are set to 0, on line 31. The loop initialization state is set to ARB_F0 on line 33. Note that incoming LISM FC arbitrated loop initialization frames are entirely discarded by the receiving FC port, and generated by calling the generator member "transmit_LISM frame" within the member function "next_frame" that is called by the member function "reset" and that runs concurrently with producer_signal until the FC port transitions to an li_state greater than LISM.

The Ii_state_machine member functions "lifa_datum," "lipa_datum," and "liha_datum" are provided below:

```
1  void li_state_machine::lifa_datum (unsigned char t)
2  {
3      if (lim)
4      {
5          if (!al_pa_found && pa_al_pa_assigned
6              && byte_count - 2 == getBitMapByte (pa_al_pa))
7          {
8              if (setBitMapByte (t, pa_al_pa))
9              {
10                 al_pa_found = TRUE;
11                 al_pa = pa_al_pa;
12             }
13         }
14         trans.transmit_byte (t);
15     }
16     else
17     {
18         if ((!al_pa_found && fa_al_pa_assigned &&
19             getBitMapByte (fa_al_pa) == byte_count - 2)
20         {
21             if (setBitMapByte (t, fa_al_pa))
22             {
23                 al_pa_found = TRUE;
24                 al_pa = fa_al_pa;
25             }
26         }
27         trans.transmit_byte (t);
28     }
29     if (byte_count == 15)
30     {
31         trans.end_frame();
32         if (lim) li_state++;
33         fc_state = NO_FRAME;
34     }
35     else byte_count++;
36 }
```

1 void li_state_machine::lifa_datum (unsigned chart) 2 3 if (lim) 4 { 5 if (!al_pa_found && pa_al_pa assigned 6 && byte count - 2 ==getBitMapByte (pa al pa)) 7 { 8 if (setBitMapByte (t, pa_al_pa)) 9 { 10 al_pa found =TRUE; 11 al_pa =pa_al_pa; 12}13}14 trans.transmit byte (t); 15}16 else 17{ 18 if ((!al_pa_found && fa alpa assigned && 19 getBitMapByte (fa al pa) ==byte[]count - 2) 20{21 if (setBitMapByte (t, fa al_pa)) 22{23 al_pa-found =TRUE; 24 al_pa =faal_pa; 25 26}27 trans.transmit byte (t); 28}29 if (byte_count ==15) 30 { 31 trans.end_frameo; 32 if (lim) li state++; 33 fc_state =NO_FRAME; 34}35 else byte-count++; 36}64 EXPRESS 0 NO. EL074352000US I void ll_state_machine::lipa-datum (unsigned chart) 2 { 3 if (lim) 4 { 5 5 if (!al_pa_found && haal_pIaassigned 6 && byte[]count - 2 =getBitMapByte (ha-aLjpa)) 7 _8 if (setBitMapByte (t, ha al-pa)) 9 _10 al_pa-found =TRUE; 11 al-pa =ha al pa; 12}13 14 trans.transmit-byte (t); 15}16 else 17 { 18 if ((!al_pa found && pa al_pa assigned && 19 getBitMapByte (pa_al_pa) ==byte_count - 2) 20 { 21 if (seteitMapByte (t, pa al pa)) 22 { 23 al pa found =TRUE; 24 al_pa pa al pa; 25}26 27 trans.transmit_byte (t); 28 ) 29 if (byte[]count ==15) 30 { 31 trans.end frame(); 32 if (lim) li_state++; 33 fc_state =NO_FRAME; 34}35 else byte[]count++; 36}65 EXPRESS 10 NO. EL074352000US I void li_state_ machine::liha_datum (unsigned char t) 2 { 3 if (!im) 4 { 5 5 if (!al-pa-found && clearBit (t)) 6 { 7 al_pa-found =TRUE;

8 al-pa =getAL-PA (t, byte-count - 2);

9}10 10 trans.tranmit-byte (t); 11}12 else 13 { .14 if ((!al_pa found && ha al_pa-assigned && 15 15 getBit-MapByte (ha-al-pa) ==byte-count - 2) 16 { 17 if (setBitMapByte (t, ha_al_pa)) 18 { 19 al_pa found =TRUE; 20 20 al_pa =ha al pa; 21}22}23 trans.transmit-byte (t); 24}25 25 if (byte_count ==15) 26 { 27 trans.end_ frameo;

28 if (rim) li-state++;

29 fc_state =NO_FRAME; 30 30

31 else byte count++; 32}

```
1   void li_state_machine::lipa_datum (unsigned char t)
2   {
3       if (lim)
4       {
5           if (!al_pa_found && ha_al_pa_assigned
6               && byte_count - 2 == getBitMapByte (ha_al_pa))
7           {
8               if (setBitMapByte (t, ha_al_pa))
9               {
10                  al_pa_found = TRUE;
11                  al_pa = ha_al_pa;
12              }
13          }
14          trans.transmit_byte (t);
15      }
16      else
17      {
18          if ((!al_pa_found && pa_al_pa_assigned &&
19              getBitMapByte (pa_al_pa) == byte_count - 2)
20          {
21              if (setBitMapByte (t, pa_al_pa))
22              {
23                  al_pa_found = TRUE;
24                  al_pa = pa_al_pa;
25              }
26          }
27          trans.transmit_byte (t);
28      }
29      if (byte_count == 15)
30      {
31          trans.end_frame();
32          if (lim) li_state++;
33          fc_state = NO_FRAME;
34      }
35      else byte_count++;
36  }
```

```
1   void li_state_machine::liha_datum (unsigned char t)
2   {
3       if (lim)
4       {
5           if (!al_pa_found && clearBit (t))
6           {
7               al_pa_found = TRUE;
8               al_pa = getAL_PA (t, byte_count - 2);
9           }
10          trans.tranmit_byte (t);
11      }
12      else
13      {
14          if ((!al_pa_found && ha_al_pa_assigned &&
15              getBitMapByte (ha_al_pa) == byte_count - 2)
16          {
17              if (setBitMapByte (t, ha_al_pa))
18              {
19                  al_pa_found = TRUE;
20                  al_pa = ha_al_pa;
21              }
22          }
23          trans.transmit_byte (t);
24      }
25      if (byte_count == 15)
26      {
27          trans.end_frame();
28          if (lim) li_state++;
29          fc_state = NO_FRAME;
30      }
31      else byte_count++;
32  }
```

These routines all have essentially the same structure. If the FC port is the LIM, then the FC port is receiving back the FC arbitrated loop initialization frame that it sent out while it was in the previous loop initialization phase and is modifying the bitmap or position map within that previously sent FC arbitrated loop initialization frame and transmitting the modified bit as part of the FC arbitrated loop initialization frame that it is generating and transmitting with respect to its current loop initialization phase. If, on the other hand, the FC port is not the LIM, it is simply processing and forwarding an FC arbitrated loop initialization frame. For example, in the li_state_machine member function "lifa_ datum," shown above, a LIM will process a byte according to lines 5–14 while a non LIM FC port will process the byte according the lines 18–27. In the case of a LIM, if the LIM has not yet acquired an AL_PA and the LIM has a previously assigned AL_PA, stored in the variable "pa_al_pa," then the LIM continuously monitors the returned bytes via calls to the member function "getBitMapByte" to detect the returned byte that corresponds to the byte of the bitmap corresponding to the previously assigned AL_PA. When the corresponding byte is detected, then, on line 8, the LIM calls the member function "setBitMapByte" to determine if the bit corresponding to the previously assigned AL_PA is set and, if not, to set that bit. If the bit was not set and is set via the call to "setBitMapByte," then lifa datum sets the LIM's variable "al_pa" to the previously assigned AL_PA on line 11 and sets the state_variable "al_pa_found" to the Boolean value TRUE on line 10. The byte being processed, whether or not modified to reflect acquisition of an AL_PA on lines 8–12, is transmitted by lifa datum on line 14. In the case that the FC port is not the LIM, then analogous code on lines 18–27 monitors the bit map being forwarded for the bit corresponding to the fabric assigned AL_PA, if the PC port has a fabric-assigned AL_PA, and if that AL_PA is not set, then the FC port acquires the fabric assigned AL_PA by setting the bit. Finally, if the end of the LIFA FC arbitrated loop initialization frame is detected, on line 29, then lifa_ datum calls the transmitter member function "end frame" to indicate to the transmitter that the frame being forwarded or transmitted by the FC port is complete, on line 31. If the FC port is the LIM, the loop initialization state is incremented on line 32. The FC port's state variable "fc_state" is set to NO_FRAME by lifa datum on line 33. Otherwise, if the end of the LIFA FC arbitrated loop initialization frame is not detected, then lifa_datum increments byte_count on line 35.

The member function "lipa datum" is analogous to the member function "lifa_datum," discussed above, and will not be discussed in detail. The only substantive differences are that the loop initialization state of the FC port is now LIPA rather than LIFA, the LIM may be monitoring the bytes in order to acquire its hardware assigned AL_PA, and, in the case of a non-LIM FC port the bit map bytes are being monitored in order to acquire a previously assigned AL_PA.

The member function "liha_datum," shown above is also similar to the member functions "lifa_datum" and "lipa_datum," except that the loop initialization state of the FC port is now LIHA. In addition, in the case that the FC port is the LIM, liha_datum is monitoring the returned bit map bytes for any unset bit using the member function "clearBit" on line 5, and if an unset bit is found, then the LIM acquires an assigned AL_PA on lines 7 and 8 by calling the member function get AL_PA on line 8.

The li_state_machine member functions "lisa_datum," "lirp_datum," and "lilp_datum" are provided below:

```
1   void li_state_machine::lisa_datum (unsigned char t)
2   {
3       if (!lim)
4       {
5           if (!al_pa_found && clearBit (t))
6           {
7               al_pa_found = TRUE;
8               al_pa = getAL_PA(t, byte_count − 2);
9           }
10          trans.transmit_byte (t);
11          if (byte_count == 15)
12          {
13              if (al_pa_found == TRUE) participating = TRUE;
14              closeWindow = TRUE;
15              trans.end_frame();
16              fc_state = NO_FRAME;
17          }
18          else byte_count++;
19      }
20      else
21      {
22          if (byte_count == 15 && LIRP_LILP_enabled)
23          {
24              li_state LIRP;
25              fc_state = NO_FRAME;
26              if (al_pa_found)
27              {
28                  participating = TRUE;
29                  trans.transmit_byte (0x01);
30                  trans.transmit_byte (al_pa);
31                  gen.transmit_FFs (126);
32              }
33              else
34              {
35                  trans.transmit_byte (0x00);
36                  gen.transmit_FFs (127);
37              }
38              blastedFFs = FALSE;
39          }
40          else if (byte_count == 15 && !LIRP_LILP_enabled)
41          {
42              closeWindow = TRUE;
43              trans.transmit_CLS ();
44              set_timer (&error);
45          }
46          else byte_count++;
47      }
48  }
```

1 void li state machine::lisa datum (unsigned chart) 2{ 3 if(!Iim) 4 { 5 if (!al pa_found && clearBit (t)) 6 { _7 al_pa-found =TRUE; 8 al_pa =getAL-PA(t, byte-count - 2); 9}10 trans.transmit byte (t); 11 if (byte count==15) 12 { 13 if (al pa_found ==TRUE) participating =TRUE; 14 closeWindow =TRUE; 15 trans.end frame(); 16 fc-state =NO_FRAME; 17}18 else byte_count++; 19}20 else 21 { 68 EXPRESS 1 NO. EL074352000US if (byte[]count ==15 && LIRP_LILP_enabled) { li_state =LIRP; fc state=NO_FRAME; if (al_pa_found) { participating =TRUE; trans.transmit byte (0x01); trans.transmitibyte (al-pa); gen.transmit-FFs (126); } else { trans.transmit byte (0x00); gen.transmit-FFs (127); } blastedFFs =FALSE; }else if (byte[]count ==15 && !LIRP-LILP-enabled) { closeWindow =TRUE; trans.transmit_CLS 0; set_timer (&error); }else byte count++; }d li_state_machine::lirp datum (unsigned char t) if (lim) { if (!blastedFFs && byte_ count <130) { if (t ==OXFF) { gen.transmit FFs(130-byte count); blastedFFs =TRUE; }else trans.transmit-byte (t); }if (byte[]count ==130). { trans.end_frame 0; li state++; blastedFFs =FALSE; }else byte_count++; }69 EXPRESS *NO. EL074352000US 22 else 23 { 24 if (al_ pa-found) 25 { 26 if (byte_count ==2) 27 { 28 index =t +1; 29 trans.transmit-byte (t +1); 30}31 else if (byte-count - 2 ==index) 32 { 33 trans.transmit byte (al-pa); 34 if (byte-count <130) 35 { 36 gen.transmit_FFs(130 - byte_count); 37 blastedFFs =TRUE; 38}39}40 else trans.transmit-byte (t); 41}42 else 43 { 44 if (!blastedFFs && byte-count <130) 45 { 46 if (t=OXFF) 47 48 gen.transmit FFs(1 30 -byte count); 49 blastedFFs TRUE; 50}51 else trans.transmit byte (t); 52}53}54 if (byte-count ==130) 55 { 56 if (!blastedFFs) trans.end-frame(); 57 fc_state =NO_FRAME; 58}59 else byte-count++; 60 61)

70 EXPRESS *NO. EL074352000US 1 void li_state_ machine::lilp_datum (unsigned char t) 2{ 3 host_position_ map[byte-count - 2] =t;

4 if (!lim) 55 { 6 if (!blastedFFs && byte-count <130) 7 { 8 if (t ==OXFF) 9{ 10 10 gen.transmit-FFs(130 - byte-count); 11 blastedFFs =TRUE; 12}13 else trans.transmit-byte (t); 14}15 15}16 if (byte-count ==130) 17 { 18 if (!Iim && !blastedFFs) trans.end-frame(); 19 if (lim) trans.transmit-CLS 0; 20 20 closeWindow =TRUE; 21 set timer (&error); 22}23 else byte count++; 24 )

```
1   void li_state_machine::lirp_datum (unsigned char t)
2   {
3       if (lim)
4       {
5           if (!blastedFFs && byte_count < 130)
6           {
7               if (t == 0xFF)
8               {
9                   gen.transmit_FFs(130 − byte_count);
10                  blastedFFs = TRUE;
11              }
12              else trans.transmit_byte (t);
13          }
14          if (byte_count == 130)
15          {
16              trans.end_frame ();
17              li_state++;
18              blastedFFs = FALSE;
19          }
20          else byte_count++;
21      }
22      else
23      {
24          if (al_pa_found)
25          {
```

```
26           if (byte_count == 2)
27           {
28               index = t + 1;
29               trans.transmit_byte (t + 1);
30           }
31           else if (byte_count - 2 == index)
32           {
33               trans.transmit_byte (al_pa);
34               if (byte_count < 130)
35               {
36                   gen.transmit_FFs(130 - byte_count);
37                   blastedFFs = TRUE;
38               }
39           }
40           else trans.transmit_byte (t);
41       }
42       else
43       {
44           if (!blastedFFs && byte_count < 130)
45           {
46               if (t == 0xFF)
47               {
48                   gen.transmit_FFs(130 - byte_count);
49                   blastedFFs = TRUE;
50               }
51               else trans.transmit_byte (t);
52           }
53       }
54       if (byte_count == 130)
55       {
56           if (!blastedFFs) trans.end_frame();
57           fc_state = NO_FRAME;
58       }
59       else byte_count++;
60   }
61 }
```

```
 1 void li_state_machine::lilp_datum (unsigned char t)
 2 {
 3     host_position_map[byte_count - 2] = t;
 4     if (!lim)
 5     {
 6         if (!blastedFFs && byte_count < 130)
 7         {
 8             if (t == 0xFF)
 9             {
10                 gen.transmit_FFs(130 - byte_count);
11                 blastedFFs = TRUE;
12             }
13             else trans.transmit_byte (t);
14         }
15     }
16     if (byte_count == 130)
17     {
18         if (!lim && !blastedFFs) trans.end_frame();
19         if (lim) trans.transmit_CLS ();
20         closeWindow = TRUE;
21         set_timer (&error);
22     }
23     else byte_count++;
24 }
```

In the member function "lisa_datum," a non-LIM FC port that has not yet acquired an AL_PA attempts to soft assign an AL_PA on lines 5–9. When the non-LIM FC port detects the end of the LISA FC arbitrated loop initialization frame on line 11, it determines whether an AL_PA has been acquired during the various loop initialization phases and, if so, sets the state variable "participating" to the Boolean value TRUE on line 13, sets closeWindow to TRUE, on line 14, to indicate that a CLS primitive can be received to terminate loop initialization at this point, in the case that the final two phases of FC arbitrated loop initialization are not supported by a node, calls the transmitter member function "end_frame" on line 15, and sets the state_variable "fc_state" to NO_FIME on line 16. If the final byte of the LISA FC arbitrated loop initialization frame is not detected, then lifa_datum increments byte_count on line 18. On the other hand, a LIM FC port processes returned bytes by simply discarding them. When the final LISA FC arbitrated loop initialization frame byte is detected on line 22, and the LIRP and LILP phases will be carried out, the LIM FC port sets the state-variable "li_state" to LIRP, on line 24, sets the state_variable "fc_state" to NO_FRAME on line 25, and transmits the LIRP FC arbitrated loop initialization frame on lines 26–37. If the LIM has acquired an AL_PA during the various loop initialization phases, as detected on line 26, then lisa_datum sets the state variable "participating" to the Boolean value TRUE on 5 line 28, and transmits the count byte of the AL_PA position map having the value "1" on line 29, inserts the acquired AL_PA into the position map by transmitting the AL_PA as the first byte of the position map on line 30, and then calls the generator member function "transmit_FFs" on line 31 to generate and transmit the remaining empty positions of the position map. If the LIM has not acquired an AL_PA, then lisa_datum transmits a count byte of 0, on line 35, and then generates and transmits empty position map positions by calling the generator function "transmit_FFs" on line 36. In either case, lisa_datum sets blasted_FFs to FALSE on line 37. If the final two phases of loop initialization will not be carried out, as detected by lisa datum on line 40, then lisa_datum sets closeWindow to TRUE, transmits a CLS primitive, and sets the timer on lines 4244. When the LIM receives this CLS primitive back from the FC, on line 27 of the member function "producer signal," then FC arbitrated loop initialization has finished. If the end of the LISA FC arbitrated loop initialization frame has not yet been detected, then lisa_datum increments byte count on line 46.

The li_state_machine member function "lirp_datum" processes bytes of the LIRP FC arbitrated loop initialization frame position map. If lirp_datum detects the end of the AL_PAs in the AL_PA position map, the remaining empty slots have not been transmitted, detected by lirp_datum on lines 5 and 7, then lirp_datum calls the generator member function "transmit_FFs" on line 9 to generate and transmit the empty slots and sets blasted_FFs to TRUE on line 10. If the end of the AL_PAs has not been reached, the AL_PA being processed is transmitted on line 12. If the end of the LIRP FC arbitrated loop initialization frame is detected, on line 14, then lirp_datum calls the transmitter member function "end-frame," increments the loop initialization state, and resets blasted_FFs to FALSE on lines 18–20. If empty slots are being received, lirp_datum simply increments byte_count on line 22. In the case that the FC port is not the LIM, and in the case that the FC port has acquired an AL_PA during the loop initialization process, lirp_datum monitors the bytes of the position map that are being processed in order to inset the FC port's acquired AL_PA into the proper position of the position map.

If the byte being processed is the count byte, then lirp datum increments the count byte and forwards the incremented count byte as the new count byte as well as setting the variable "index" to the position of the position map into which the FC port will insert its AL_PA on lines 30 and 31. If the byte being processed corresponds to the position of the position map into which the FC port will insert its AL_PA, as detected on line 33 by lirp_datum, then lirp_datum inserts the FC port's AL_PA into the position map by transmitting the FC port's AL_PA on line 35 and then generates and transmits the remaining empty slots on lines 39 and 40. If the FC port has not acquired an AL_PA, then, on lines 47–62, lirp_datum simply forwards the LIRP FC arbitrated loop frame, generating empty slots of the AL_PA position map.

Finally, in the li state_machine member function "lilp_datum," the FC port places received position map bytes into the host_position_map data structure, on line 3. In the case of a non-LIM FC port, the FC port forwards the bytes onto the next FC port in the arbitrated loop on line 4–15. By contrast, a LIM will simply discard the bytes received once the LIM has placed the position map into the house_position_map data structure. When the end of the position map is detected by lilp_datum on line 16, the FC port prepares to finish the loop initialization process. A LIM transmits a CLS primitive, on line 19, in order to terminate the loop initialization process. All FC ports set closeWindow to TRUE, to enable termination upon receipt of a CLS primitive.

Again, the fast and cost-effective software implementation of the FC arbitrated loop initialization protocol is made possible both by generating large portions of the FC arbitrated loop initialization frames, rather than storing and forwarding those portions of the initialization frames, and by recognizing that very little internal buffering is required because of the inherent internal buffering within the other FC ports of the arbitrated loop.

Although the present invention has been described in terms of a particular embodiment, it is not intended that the invention be limited to this embodiment. Modifications within the spirit of the invention will be apparent to those skilled in the art. For example, many different specification-level implementations may implement the present invention. Different specification languages can be used, functionality can be distributed differently between different hardware components, and different hardware components can be employed to implement the present invention. The minimal buffer size calculation is different for different implementations, and may produce minimal sizes less than or greater than the 16-byte minimal size determined for the TL. Hardware generation of FC frame headers and empty AL_PA position map slots can be also accomplished in many different ways.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed. Obviously, many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. An interface controller that operates within a fibre channel node to implement all phases of the fibre channel loop initialization protocol, the interface controller coupled to receiver and transmitter components that are both, in turn, coupled to a communications network transport medium through which the fibre channel node exchanges frames composed of an ordered set of data units with other fibre channel nodes, the interface controller comprising:
    a frame manager that receives data units from the receiver and that transmits data units to a transmitter, the frame manager, receiver, and transmitter together providing an inherent data buffering capacity to the fibre channel node;
    a logic component that processes data units received by the frame manager, that initiates transmission of data units by the frame manager, and that coordinates the transmission of data units with respect to the reception of data units in order to implement all phases of the fibre channel loop initialization protocol;
    a memory buffer having a size of at least 13 bytes that, combined with the inherent data buffering capacity of the fibre channel nodes coupled to the transport medium of the communications network, is sufficient in size to hold data units of a frame being received by the frame manager until the data units are processed by the logic component; and
    a generator that generates and transmits to the transmitter certain data units required by the fibre channel loop initialization protocol for inclusion in a frame being transmitted by the frame manager.

2. The interface controller of claim 1 wherein, when a frame being received by the frame manager needs to be forwarded to another communications network node following processing of the frame by the logic component, only those data units of the forwarded frame that cannot be generated by the generator are transmitted to the transmitter by the frame manager, and the remaining data units of the forwarded frame are generated and transmitted to the transmitter by the generator.

3. The interface controller of claim 2 wherein the interface controller operates within a fibre channel communications network.

4. The interface controller of claim 3 wherein the interface controller operates within a fibre channel arbitrated loop.

5. The interface controller of claim 4 wherein the generator generates frame headers, loop initialization identifier fields, and loop initialization flags fields of all fibre channel arbitrated loop initialization frames, as well as port name fields of the loop initialization select master initialization frames and empty arbitrated loop physical address position map slots within loop initialization report position and loop initialization loop position fibre channel arbitrated loop initialization frames.

6. The interface controller of claim 5 wherein the minimally sized memory buffer has a capacity to store about 16 8-bit bytes.

7. A method for processing frames within an interface controller according to all phases of fibre channel loop initialization protocol, the interface controller used in a fibre channel port within a fibre channel node to exchange frames composed of an ordered set of data units with other fibre channel nodes, the method comprising:
    coupling the interface controller to a receiver and a transmitter that are both, in turn, coupled to a communications network transport medium through which the fibre channel node exchanges frames units with the other fibre channel nodes;
    receiving data units of a frame from the receiver;
    when the data units are immediately processed, processing certain of the received data units according to the fibre channel loop initialization protocol;

when the received data units are not immediately processed, because another task is simultaneously being carried out by the interface controller, storing in a memory buffer only the received data units that represent values required for processing the frame according to fibre channel loop initialization protocol or that cannot be generated by the hardware logic circuit based on inherent and acquired characteristics of the fibre channel loop initialization port, and later processing certain of the received data units according to the fibre channel loop initialization protocol; and when the received frame needs to be forwarded to another fibre channel node, according to the fibre channel loop initialization protocol, transmitting the received data units that cannot be generated by a hardware logic circuit based on inherent and acquired characteristics of the fibre channel port to the transmitter for inclusion in the frame to be forwarded and generating and transmitting to the transmitter by a hardware logic circuit the remaining data units of the frame to be forded.

8. The method of claim 7 wherein the interface controller operates within a fibre channel communications network.

9. The method of claim 8 wherein the interface controller operates within a fibre channel arbitrated loop.

10. The method of claim 9 further including:

generating frame headers, loop initialization identifier fields, and loop initialization flags fields of all fibre channel arbitrated loop initialization frames, as well as port name fields of loop initialization select master initialization frames and empty arbitrated loop physical address position map slots within loop initialization report position and loop initialization loop position fibre channel arbitrated loop initialization frames.

11. The method of claim 7 wherein, because of inherent buffering capacity within communications network nodes coupled to the communications network transport medium and because most data units of a frame transmitted by the communications network node are generated by the hardware logic circuit, only a small portion of the received data units of any frame that represent values required for processing the frame according to network communications protocol or that cannot be generated by a hardware logic circuit based on inherent and acquired characteristics of the network communications port need to be stored in memory.

12. The method of claim 11 wherein a maximum of only 16 8-bit bytes of memory need to be stored in memory during the reception of a frame.

13. A method for decreasing loop initialization latency and for minimizing a size of a memory buffer required within a component of a fibre channel arbitrated loop interface controller that implements the loop initialization protocol within a fibre channel port and that contains a frame manager coupled to receiver and transmitter components, the method comprising:

providing within the-interface controller state machines and circuitry for carrying out all phases of loop initialization without the need for external intervention by a host processor; and generating, rather than storing and forwarding, those portions of loop initialization frames that can be generated based on acquired and inherent characteristics of the fibre channel port that contains the interface controller.

14. The method of claim 13 wherein generating, rather than storing and forwarding, those portions of loop initialization frames that can be generated based on acquired and inherent characteristics of the fibre channel port includes generating:

frame headers of all fibre channel arbitrated loop initialization frames, loop initialization identifier fields of all fibre channel arbitrated loop initialization frames, loop initialization flags fields of all fibre channel arbitrated loop initialization frames, port name fields of the loop initialization select master initialization frames, and empty arbitrated loop physical address position map slots within loop initialization report position and loop initialization loop position fibre channel arbitrated loop initialization frames.

15. The method of claim 13 further including:

subtracting a portion of the inherent buffering capacity within the frame manager, receiver, and transmitter components of all fibre channel ports receiving and transmitting fibre channel arbitrated loop initialization frames from the memory buffering capacity required by the component of the fibre channel arbitrated loop interface controller that implements the loop initialization protocol to calculate a minimum buffering capacity required and providing in the component of the fibre channel arbitrated loop interface controller that implements the loop initialization protocol a memory buffer having the calculated minimum buffering capacity.

* * * * *